United States Patent [19]

Matsubayashi et al.

[11] Patent Number: 4,686,152
[45] Date of Patent: Aug. 11, 1987

[54] PACKAGING MATERIAL COMPRISING IRON FOIL, AND CONTAINER AND CONTAINER LID COMPOSED THEREOF

[75] Inventors: Hiroshi Matsubayashi, Kamakura; Kazumi Hirota, Tokyo; Hisao Iwamoto, Yokohama; Tamio Fujiwara, Tokyo; Nobuyuki Sato; Tadahiko Katsura, both of Yokohama, all of Japan

[73] Assignee: Toyo Seikan Kaisha, Ltd., Tokyo, Japan

[21] Appl. No.: 799,388

[22] Filed: Nov. 18, 1985

[30] Foreign Application Priority Data

Nov. 16, 1984 [JP] Japan .................................. 59-240507
Jun. 7, 1985 [JP] Japan .................................. 60-122644

[51] Int. Cl.$^4$ ............................................. B32B 15/08
[52] U.S. Cl. .................................... 428/607; 428/626; 428/648; 428/667; 428/679; 428/925; 220/456; 220/457
[58] Field of Search ............... 428/577, 624, 625, 626, 428/679, 667, 648, 607, 925, 35, 926; 220/456, 457, 458; 72/46, 47

[56] References Cited

U.S. PATENT DOCUMENTS

| | | | |
|---|---|---|---|
| 3,932,144 | 1/1976 | Matsubara et al. | 428/626 |
| 3,934,527 | 1/1976 | Saunders | 220/456 |
| 4,125,670 | 11/1978 | Perfetti et al. | 428/626 |
| 4,143,790 | 3/1979 | Ueno et al. | 220/458 |
| 4,177,323 | 12/1979 | Obi et al. | 428/626 |
| 4,393,582 | 6/1983 | Kitamura et al. | 428/626 |
| 4,405,058 | 9/1983 | Phalin | 220/458 |
| 4,450,977 | 5/1984 | Colburn et al. | 220/458 |
| 4,452,374 | 6/1984 | Hitchcock et al. | 220/458 |
| 4,452,375 | 6/1984 | Marcus | 220/456 |
| 4,507,339 | 3/1985 | Carbo et al. | 72/46 |

FOREIGN PATENT DOCUMENTS 2076692A 12/1981 United Kingdom .............. 220/458

Primary Examiner—Melvyn J. Andrews
Assistant Examiner—John J. Zimmerman
Attorney, Agent, or Firm—Sughrue, Mion, Zinn, Macpeak and Seas

[57] ABSTRACT

Disclosed is a packaging material which comprises a laminate having an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ }\mu\text{m} \geq T \geq 15 \text{ }\mu\text{m}$$

and being provided with a surface treatment layer containing metallic tin, metallic chromium or metallic nickel, and an organic resin covering having a total thickness (t) in the range represented by the following formula:

$$T^{1/n}C/\sigma_B \geq t \geq 3 \text{ }\mu\text{m}$$

wherein n is 5.6 and C is 4630.

A metal or pigment having an action of improving the processability, an anti-corrosive action and a hiding action is incorporated or contained in the organic resin coating layer. This packaging material is excellent in processability, corrosion resistance, storability, appearance characteristics and safety.

21 Claims, 9 Drawing Figures

PACKAGING MATERIAL COMPRISING IRON FOIL, AND CONTAINER AND CONTAINER LID COMPOSED THEREOF

BACKGROUND OF THE INVENTION (1) Field of the Invention

The present invention relates to a packaging material comprising an iron foil. More particularly, the present invention relates to a packaging material excellent in processability, corrosion resistance, storability, appearance characteristics and safety. Furthermore, the present invention relates to a packaging container and a packaging container lid, which are composed of this packaging material.

(2) Description of the Prior Art

As packaging materials heretofore used for containers and lids, there can be mentioned metals, plastics, paper, glass and ceramics and composite materials thereof. In view of the combination of the barrier property to gases such as oxygen, carbon dioxide gas and water vapor and the mechanical strength, metal materials are most preferred.

However, disposal of metal cans or metal lids by incineration is difficult and there arises a problem of so-called can pollution. Accordingly, laminates composed of a metal foil and a resin film are used as packaging materials that can be easily disposed of in the field of sealing containers or sealing lids. Almost all of commercially available laminates for containers or lids comprise an aluminum foil as the substrate. Although the aluminum foil is excellent in the appearance characteristics and flexibility, corrosion such as pitting or peeling of the coating layer is readily caused by a content containing a salt such as sodium chloride at a relatively high concentration or a content containing an organic acid even though the surface is coated with an organic resin, and defects such as leakage of the content and reduction of the storability are brought about.

As the metal foil, there can also be mentioned foils composed mainly of iron or steel, such as pure iron foils, steel foils and tinplate foils. However, many problems should be solved when these foils are used as packaging materials for foods. Iron or steel is a metal which is likely to rust, and rusting is readily caused in the process for the production of a packaging material or during the storage and the appearance or commercial value is drastically degraded by rusting. Furthermore, dissolution of iron or incorporation of rust results in drastic degradation of the content flavor-retaining property.

Furthermore, since the thickness of an iron or steel foil is much smaller than that of a steel plate, the iron foil or steel foil is very poor in the draw processability or formability, and wrinkles are formed at the drawing step or the foil is broken during the processing, with the result that formation of a container becomes difficult. This defect becomes prominent when a relatively thick organic resin coating is formed so as to improve the corrosion resistance or the rusting resistance.

More specifically, it was found that if the thickness of a steel sheet is reduced below 0.12 mm and a laminate of this steel sheet and an organic resin coating layer is formed into a drawn container, the following problems arise. In the first place, wrinkles are readily formed in the part ranging from the flange portion to the side wall at the draw-forming step, and because of the presence of these wrinkles, attainment of sure sealing by heat sealing or wrap seaming becomes difficult. In case of a container in which formation of wrinkles is prevented, however, if the container is stored for a long time after filling of the content and sealing, corrosion below the organic resin coating is advanced in the inner surface portion of the container, especially in the side wall portion, is advanced, and the life of the product is drastically shortened by reduction of the gas barrier property or dissolution of the metal. The reason is that if the wrinkle controlling pressing force is increased so as to reduce formation of wrinkles at the step of forming the container, the organic resin coating on the inner surface or the bonding interface between the resin coating on the inner surface and the steel foil is damaged or even if not damaged, a stress causing the peeling is left.

Another important problem are sides in that the iron foil has a larger rigidity than the aluminum foil and the thickness of the iron foil generally corresponds to the thickness of a sharp blade edge, and therefore, when the finger tip touches the cut edge of the iron foil, the finger tip is readily cut. Moreover, even if the surface of the iron foil is carefully coated and protected, rusting is readily caused from the exposed cut edge.

SUMMARY OF THE INVENTION

It is a primary object of the present invention to obviate the foregoing defects brought about when an iron foil is used for a packaging material.

Another object of the present invention is to provide a packaging material comprising an iron foil, which is excellent in processability, corrosion resistance, storability, appearance characteristics and safety.

Still another object of the present invention is to provide a packaging material suitable for sealing a container for filling a food therein, especially a draw-formed container, and a container lid.

Still another object of the present invention is to provide a container having no side seam, which is composed of an iron foil/organic resin composite material and can be easily disposed of and easily prepared, and a process for the production thereof.

More specifically, in accordance with one fundamental aspect of the present invention, there is provided a packaging material, which comprises a laminate having an iron foil having a tensile force ($\sigma_B$) in the range represented by the following formula:

$$100 \text{ kg/mm}^2 \geq \sigma_B \geq 30 \text{ kg/mm}^2 \tag{1}$$

and a thickness (T) in the range represented by the following formula:

$$120 \text{ }\mu\text{m} \geq T \geq 15 \text{ }\mu\text{m} \tag{2}$$

and being provided with a surface treatment layer containing metallic tin, metallic chromium or metallic nickel, and an organic resin covering having a total thickness (t) in the range represented by the following formula:

$$T^{1/n}C/\sigma_B \geq t \geq 3 \text{ }\mu\text{m} \tag{3}$$

wherein n is 5.6 and C is 4630.

In accordance with another aspect of the present invention, there is provided a packaging material as set forth above, wherein at least one surface of the iron foil has an organic resin coating layer containing a metal or pigment, which has a sufficient intercepting action to a corrosive component and a sufficient hiding action, and the entire organic resin coating on the iron foil substrate has a thickness of 15 to 200 μm.

In accordance with still another aspect of the present invention, there is provided a draw-formed container obtained by subjecting a laminate as set forth above to draw forming.

Figure 1:
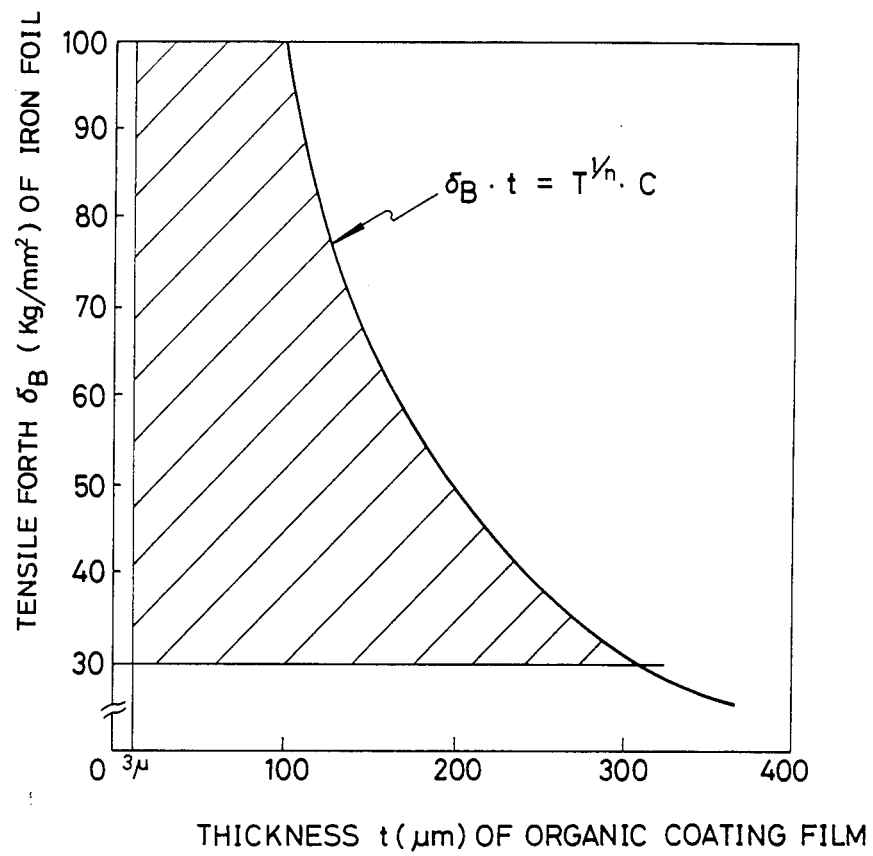
FIG. 1 is a graph illustrating the scope of the present invention, in which the tensile force B of the iron foil is plotted on the ordinate and the thickness t of the organic coating is plotted on the abscissa.

In the drawings, reference numerals 1 and 2 represent a laminate and an iron or steel foil, each of reference numerals 4 and 6 represents an organic resin coating material, reference numeral 10 represents a wrinkle presser, reference numeral 11 represents a punch, reference numeral 12 represents a die, reference numeral 13 represents an iron or steel foil, each of reference numerals 14a and 14b represents a surface treatment layer, each of reference numerals 15, 15a and 15b represents an adhesive layer, reference numeral 16 represents an inner face coating of an organic resin, and reference numeral 17 represents an outer face coating of a metal- or pigment-incorporated organic resin.

DETAILED DESCRIPTION OF THE PREFERRED EMBODIMENTS

The present invention is based on the finding that use of an iron foil having a surface treatment layer containing metallic tin, metallic chromium or metallic nickel and adjustment of the tensile of the tensile force ($\sigma_B$) and thickness (T) of the iron foil and the total thickness (t) of an organic resin coating within certain ranges are critical for preparing formation of wrinkles at the draw-forming step and preventing corrosion of the iron foil.

Ordinarily, in the draw forming of metals or resins, in the peripheral portion of a blank (a material to be draw-formed), not only reduction of the dimension in the circumferential reduction but also plastic flowing in the axial direction of the container is caused, whereby the blank is formed into a final container. In case of a metal blank, it is found that at this draw forming step, formation of wrinkles in the peripheral portion becomes prominent with decrease of the thickness of the metal blank. It is considered that the reason is that as the thickness is reduced, buckling of the blank in the peripheral direction is caused. Furthermore, in case of a metal/organic resin coating laminate, it is found that at the draw forming step, formation of wrinkles in the peripheral portion becomes conspicuous with increase of the thickness of the organic resin coating. The reason is considered to be that if the thickness of the resin layer is increased, the deformation of the resin layer per se by the wrinkle-controlling pressing force is increased and the wrinkle-controlling pressing force is hardly transmitted to the metal layer. Of course, if the wrinkle-controlling force applied to the peripheral portion of the blank being draw-formed is increased, formation of wrinkles can be controlled, but in this case, the organic resin layer of the bonding interface between the organic resin layer and the metal is readily damaged, as pointed out hereinbefore. Furthermore, the wrinkle-controlling force required has a close relation to the tensile force of the metal, and ordinarily, a higher wrinkle-controlling force becomes necessary as the tensile force of the metal is increased.

According to the present invention, by adjusting the tensile force ($\sigma_B$) and thickness (T) of the iron foil and the total thickness (t) of the organic resin coating within the ranges represented by the above-mentioned formulae (1), (2) and (3), respectively, at the draw forming step, formation of wrinkles in the flange or side wall portion of the container can be prevented with a relatively small wrinkle-controlling force to improve the sealing property of the container and damage of the resin coating layer or the bonding interface between the coating layer and the iron foil is prevented to improve the corrosion resistance of the container.

The upper limit value of the formula (1) is determined by the wrinkled-controlling force necessary for preventing formation of wrinkled, and if the tensile force ($\sigma_B$) exceeds the upper limit value, an excessively large wrinkle-controlling force becomes necessary and the corrosion resistance is reduced by damage of the bonding interface. Moreover, if the tensile force exceeds the upper limit value, cutting of the blank is caused at the draw forming step or the thickness becomes uneven because of non-uniform plastic flowing.

A prominent advantage attained by the use of an iron foil is that since the iron foil has a much larger tensile force than an aluminum foil or the like, even if the thickness of the iron foil is considerably small, the obtained draw-formed container has a strong nerve. However, if the tensile force of the iron foil is smaller than the lower limit value of the formula (1), the above-mentioned advantage cannot be attained.

The lower limit value of the thickness (T) of the iron foil represented by the above formula (2) is empirically determined by experiments based on the above-mentioned phenomenon. If the thickness is smaller than the lower limit value, it is difficult to prevent formation of wrinkles, even though other conditions are controlled. Moreover, if the thickness is smaller than the lower limit value, it is difficult to attain complete interception of gases by the iron foil. The uppper limit value of the thickness (T) of the iron foil represented by the formula (2) is determined so as to attain the objects of reducing the weight of the container, saving the resource and facilitating the disposal treatment.

The upper limit value of the thickness (t) of the organic resin coating represented by the above formula (3), that is, the value represented by the following formula:

$$\sigma_B \cdot t = T^{1/n} \cdot C \quad (4)$$

is an experimental value determined based on the above consideration and the experimental results.

FIG. 1 of the accompanying drawings is a graph showing the scope of the present invention, in which the tensile force $\sigma_B$ of the iron foil is plotted on the ordinate and the thickness t of the organic coating is plotted on the abscissa. In FIG. 1, the curve is a hyperbola given by the above formula (4). At first, it is checked whether or not wrinkles are formed by changing $\sigma_B$ and t while keeping the thickness T of the iron foil constant and maintaining the wrinkle-controlling force at a relatively small constant value. As the result, it is found that wrinkles are formed on the right side of the critical line shown in FIG. 1 and wrinkles are not formed on the left side of the critical line. Then, formation of wrinkles are similarly checked while maintaining the wrinkle-controlling force at a relatively large value. It is found that the critical line is gradually shifted to the right. However, if the wrinkle-controlling force exceeds a certain value, damage of the organic coating or the bonding interface is caused on either the right side or the left side of the critical line. The value represented by the formula (4) is determined as the critical value not causing damage of the organic coating or bonding interface. It has also been found that this critical value, that is, the product of $\sigma_B$ and t, is proportional to the value of $T^{1/n}$.

In FIG. 1, the results obtained in the examples and comparative examples given hereinafter are plotted, and it will be readily understood that if the requirement represented by the formula of $t \leq T^{1/n} \cdot C/\sigma_B$ is satisfied, formation of wrinkles and corrosion of the iron foil are effectively prevented.

The lower limit value of the coating thickness (t) of the formula (3) is determined so that a complete coating force of such defects as pinholes or cracks can be formed on the iron foil.

From the view point of the corrosion resistance and the processability, it is important that the iron foil used in the present invention should be provided with a surface treatment layer having a layer of a metal selected from the group consisting of metallic tin, metallic chromium and metallic nickel. In case of a surface-treated iron foil not provided with such a metal layer.

Figure 2:
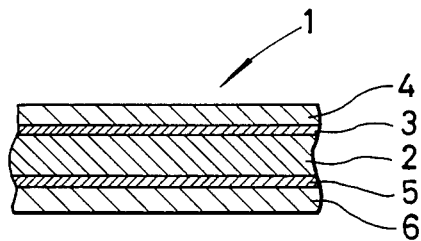
FIG. 2 is a sectional view illustrating the sectional structure of an example of the laminate used in the present invention.

Referring to FIG. 2 illustrating an embodiment of the laminate used in the present invention, this laminate 1 comprises an iron foil 2, an inner face coating layer 4 of an organic resin formed on the surface, to be formed into an inner face of the final container, of the iron foil 2, if necessary, through an adhesive layer 3, and an outer face coating layer 6 of an organic resin formed on the surface, to be formed into an outer face of the final container, of the iron foil 2, if necessary, through an adhesive layer 5.

As the iron foil 2, a surface-treated iron foil satisfying the above-mentioned requirements is used. This surface-treated iron foil will be described in detail hereinafter.

In accordance with one preferred embodiment of the present invention, at least one of the organic resin coating layers 4 and 6 has a metal or pigment so that the processability is improved and an action of intercepting corrosive components as well as hiding any corrosion can be attained.

Figure 4:
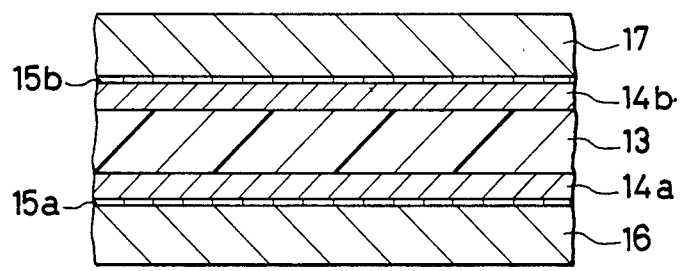
FIG. 4 is a sectional view illustrating the sectional structure of a fundamental example of the packaging material according to the present invention.

FIG. 4 is a diagram illustrating the sectional structure of a basic packaging material of this type. In FIG. 4, the upper portion corresponds to the outer face side and the lower portion corresponds to the inner face side (the side falling in contact with the content) (the same will apply in the figures described hereinafter).

This packaging material comprises an iron foil 13 having a thickness of 5 to 120 μm, a surface treatment layer 14a consisting of a metal-plated layer and, optionally, a chromate layer, which is formed on the inner face side of the iron foil 13, and an inner face coating 16 of an organic resin formed on the surface treatment layer 14a, if necessary, through an adhesive layer 15a. In this embodiment, a surface treatment layer 14b is similarly formed on the outer face side of the iron foil 13, and an outer face coating 16 of an organic resin containing a metal or pigment is formed on the surface treatment layer 14b, if necessary, through an adhesive layer 15b.

The reason why the iron foil is used in the present invention is that the speed of pitting by a content containing sodium chloride or the like is much lower than in an aluminum foil. Accordingly, the corrosion resistance and gas barrier property of the packaging material can be highly improved by the use of the iron foil. Furthermore, the Young's modulus of the iron foil is about 2.5 times the Young's modulus of the aluminum foil, and a sufficient strength or shape-retaining property can be obtained with a relatively small thickness. Moreover, the iron foil is readily available at a lower cost than the aluminum foil, and the cost of the packaging material can be reduced.

It is important that the iron foil should have a thickness of 5 to 120 μm, especially 8 to 100 μm. If the thickness of the iron foil is smaller than 5 μm, it is difficult to obtain a foil free of defects such as pinholes and hence, a satisfactory barrier property to various gases and water vapor can hardly be attained. If the thickness of the iron foil exceeds 120 μm, the final container or lid is too rigid, and the disposal treatment becomes difficult and the problem of covering of the cut edge arises as described hereinafter. A preferred thickness differs according to the intended use. For example, it is preferred that the thickness of the iron foil be 10 to 40 μm in case of a tape tab (opening tab for a lid), 5 to 30 μm in case of a pouch and 10 to 120 μm in case of a heat-sealable lid. Of course, uses of the packaging material of the present invention are not limited to those exemplified above.

In the present invention, from the view point of the corrosion resistance and the adhesion of the organic resin coating, it is important that a surface treatment layer consisting of a metal-plated layer and optionally, a chromate layer formed thereon should be formed on the iron foil 13. The organic resin coating is effective for preventing the content from falling into direct contact with the iron foil, but the organic resin coating considerably allows permeation of a hydrogen ion from an organic acid or the like contained in a highly corrosive content and slightly allows permeation of an anion such as a chloride ion contained in sodium chloride or the like. Accordingly, peeling of the organic resin coating is readily caused in the interface between the organic resin coating and the iron foil, and if peeling is once caused, rusting, dissolution of iron or corrosion such as pitting is advanced in the peeled portion.

According to the present invention, by forming a surface treatment layer consisting of a metal-plated layer and optionally, a chromate layer on the iron foil, the barrier action to a corrosive component as described above is exerted by the metal-plated layer, and furthermore, the metal-plated layer enhances the adhesion of the organic resin coating.

A metal which is softer than iron and has an anti-corrosive effect to iron, such as Ni, Sn, Zn or Al, is advantageously used for the metal-plated layer. The layer formed by plating such a metal is excellent in the anti-corrosive effect, and when the iron foil is cut, this plated metal flows to the cut edge and exerts an unexpected and novel function of protecting the cut edge and preventing the cut edge portion from rusting. The fact that when the iron foil provided with the metal-plated layer is cut, the plated metal flows and is present in the cut edge portion is proved by the fact that when this cut edge portion is observed by an X-ray microanalyzer, the presence of the plated metal in the cut edge portion is confirmed.

It is preferred that in the metal-plated layer, a metal having a Vickers hardness Hv lower than 500, especially lower than 400, be present in a coated amount of 0.1 to 15 $g/m^2$, especially 0.2 to 12 $g/m^2$. If a metal having a Vickers hardness higher than 500 is plated, the plated metal does not flow in the cut edge portion when the iron foil is cut, and the effect of preventing the cut edge portion from rusting cannot be obtained. If the coated amount of the plated metal is smaller than 0.1 $g/m^2$, the effect of intercepting the corrosive component or the anti-corrosive effect is insufficient and the effect of preventing the cut edge portion from rusting cannot be attained. If the amount of the plated metal is larger than 15 $g/m^2$, the laminate becomes economically disdvantageous and the advantage attained by the use of the iron foil is cancelled by its disadvantage.

A nickel-plated layer is especially excellent in the effect of intercepting a corrosive component. As an easily available plated iron, there can be mentioned a tin-plated iron foil, that is, a tinplate foil. In case of this tinplate foil, a sufficient corrosion resistance and a satisfactory adhesion of the organic resin coating can be obtained even if the amount coated of tin is relatively small, for example, in the range of 0.5 to 10 $g/m^2$. The tin layer may be a metallic tin layer, but in view of the adhesion of the organic resin coating, it is preferred that the tin layer be present in the form of a tin/iron alloy layer in which the Sn/Fe atomic ratio is in the range of from 2 to 1.

As the chromate layer, there can be mentioned a chromium oxide layer composed mainly of hydrous chromium oxide in which the amount coated as Cr is 1 to 50 $mg/m^2$, especially 3 to 35 $mg/m^2$. This chromate layer may be formed by performing a known formation treatment and/or a known chemical treatment on the above-mentioned metal-plated layer.

In the case where rusting in the cut edge portion does not cause any particular trouble, for example, in case of a draw-formed container obtained by curling the end portion, there may be used a tin-free steel foil (electrolytically chromate-treated steel foil) in which the metal-plated layer is a metallic chromium layer and a chromate layer is present on the metallic chromium layer. It is preferred that the metallic chromium layer be present in an amount coated of 0.03 to 0.5 $g/m^2$, especially 0.05 to 0.3 $g/m^2$, and that the thickness of the chromate layer should correspond to an amount coated of 3 to 50 $mg/m^2$, especially 7 to 30 $g/m^2$, as the Cr atom.

The metal-plated layer may comprise a single metal layer or a plurality of layers of different metals. For example, the metal-plated layer may comprise a layer of a soft metal such as nickel as the lower plating layer and a chromium layer formed by the electrolytic chromate treatment as the upper plating layer, and a chromium oxide layer may further be optionally formed on the upper plating layer.

In the present invention, an organic resin coating is formed on the above-mentioned surface-treated iron foil. It is important that an organic resin coating containing a metal or pigment having an action of improving the processability, an intersecting action to a corrosive component and a hiding action should be formed on one or both of the surfaces of the surface-treated iron foil. Namely, by using a coating containing such a metal or pigment, the processability of the iron foil is improved. The iron foil is much inferior to a steel plate in the draw processability and formability because of its thin thickness. The reason is that wrinkles are formed at the draw-forming step. Even if the wrinkle-controlling force is increased so as to prevent formation of wrinkles, when there is present an oragnic coating film, the wrinkle-controlling force is not sufficiently transmitted to the foil surface through the organic coating film. Furthermore, if the wrinkle-controlling force is excessively increased, the foil is broken because of its low strength, and formation of a container becomes impossible.

It is considered that in the present invention, the metal or pigment in the organic resin coating hardens the organic resin coating per se, and hence, the wrinkle-controlling force is efficiently transmitted even to the foil and a drawn container free of wrinkles can be formed.

Furthermore, by using the coating containing the above-mentioned metal or pigment, the corrosion of the iron foil by the corrosive component is highly controlled, and for example, generation of hydrogen is highly controlled and the shell life of the final container is considerably prolonged. Moreover, even if rusting is caused on the iron foil during the long-period storing, the rust is hidden and good appearance characteristics can be maintained for a long time, and the commercial value can be increased.

As the metal having the above-mentioned functions, there can be mentioned vacuum-deposited metallic aluminum. A vacumm-deposited aluminum layer formed in a thickness of 0.01 to 0.2 μm, especially 0.03 to 0.1 μm, on the surface of a polyethylene terephthalate film or a polypropylene film formed by the casting method is advantageously used. If this aluminum-vacuum-deposited aluminum film layer is formed, a packaging material having a good metallic gloss and an excellent storability (long shell life) can be provided.

As the pigment having the above-mentioned functions, there can be mentioned titanium dioxide, especially rutile type titanium dioxide. Among various pigments, this titanium oxide has a highest action of controlling the corrosion of the iron foil by a corrosive component, and is excellent in the hiding power. Accordingly, a packaging material which can be kept white for a long time can be provided. This titanium dioxide is incorporated into a resin film, an adhesive layer or a lacquer so that the amount coated of titanium dioxide is 0.5 to 30 $g/m^2$, especially 1 to 20 $g/m^2$. Furthermore, an aluminum flake pigment, a tin oxide pigment or a zinc oxide pigment having the above-mentioned functions instead of titanium dioxide or in combination therewith. The amount coated of such a pigment is the same as described above with respect to titanium dioxide.

In this embodiment, it also is important in view of the processability, formability and safety that the entire thickness of the organic resin coating should be 15 to 200 μm, preferably 20 to 180 μm, especially preferably 30 to 160 μm. In case of an iron foil, a cut edge is sharp and the finger or the like is easily hurt on contact with the cut edge, as pointed out hereinbefore. According to the present invention, by forming a resin coating layer having the above-mentioned thickness, the above risk is completely obviated and a high degree of safety is guaranteed in a packaging material comprising an iron foil. If the thickness is too small and outside the above-mentioned range, it is difficult to obviate the danger of the cut edge, and if the thickness is too large and outside the above-mentioned range, the formability into a container or lid or the processability is degraded.

The packaging material of this type according to the present invention may have various laminate structures instead of the structure shown in FIG. 4, so far as the above-mentioned requirements are satisfied. Several examples will now be described, though the packaging material of the present invention is not limited to those described below.

Figure 5:
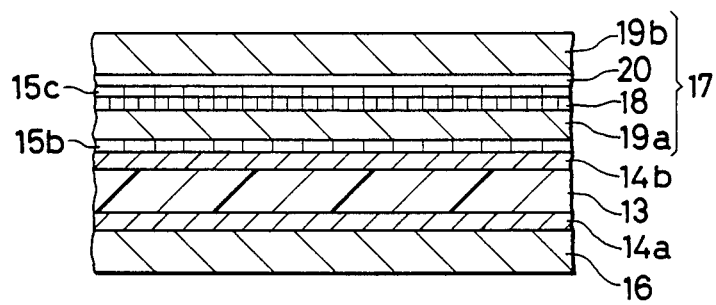
FIG. 5 is a sectional view showing a laminate suitable for a tape tab of an easy-open container lid.

FIG. 5 shows a laminate suitably used for a tape tab (peeling opening piece) of an easy-open container lid. On both the surfaces of a pure iron foil 13, there are formed surface treatment layers 14a and 14b, each comprising a nickel-plated layer, a metallic chromium layer and a chromium oxide layer (hydrous chromium oxide layer), formed in the recited order on the iron foil. On the inner face side, an inner face protecting resin layer 16 is formed through the surface treatment layer 14a by using a vinyl chloride resin organosol lacquer. An outer face protecting resin coating 17 comprises a polyester film 19a (biaxially drawn, heat-set polyethylene terephthalate film) provided with a metallic aluminum-vacuum-deposited layer 18 and a polyester film 19b provided with a printing ink layer 20. The two polyester films are laminated through an adhesive layer 15c so that the vacuum-deposited layer 18 confronts the ink layer 20, and the outer face protecting resin coating 17 is bonded to the surface treatment layer 14b through an adhesive layer 15b in such a positional relation that the vacuum-deposited layer 18 is located on the inner side and the ink layer 20 is located on the outer side.

In the tape tab having the above-mentioned laminate structure, since nickel-plated layers are located on both the surfaces, rusting in the cut edge portion is substantially prevented by flowing of the metal of the plating layer. Furthermore, since the metallic chromium and chromium oxide layers are formed on both the surfaces, the tape tab is especially excellent in the combination of the corrosion resistance and the adhesion of the organic resin coating. Moreover, since the structure has covering resin films having a large thickness, the high degree of safety of the cut edge is high, and because of the presence of the vacuum deposition layer and ink layer, good appearance characteristics and a high commercial value can be maintained for a long time.

Figure 6:
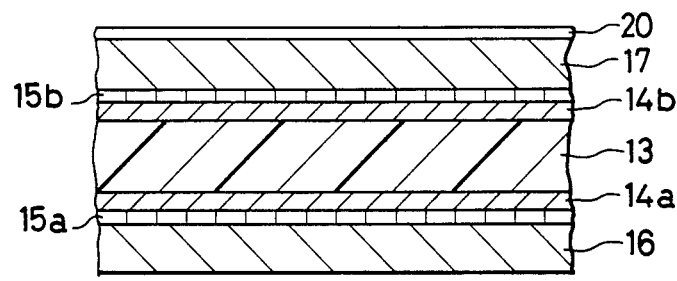
FIG. 6 is a sectional view showing a laminate suitable for a container or container lid obtained by draw forming.

FIG. 6 shows a laminate suitable for a draw-formed container such as a flanged container for a draw-formed metal cup. Surface treatment layers 14a and 14b, each comprising a metallic chromium layer and a non-metallic chromium layer, formed on this order on the foil, are formed on the iron foil 13. An inner face protecting coating layer 16 of polyethylene or polypropylene containing titanium dioxide incorporated therein is formed on the inner face side through an adhesive layer 15a of an acid-modified olefin resin or a urethane resin. An outer face protecting coating layer 17 of polyethylene, polypropylene, nylon or polyester containing titanium dioxide incorporated therein is formed on the outer face side through a similar adhesive layer 15b. A printing ink layer 20 is formed on this outer face protecting coating layer 17.

Since a draw-formed container or container lid composed of this laminate structure has on each of both the surfaces of the steel foil an electrolytic chromate surface treatment layer and a titanium dioxide-incorporated resin layer, the corrosion resistance is especially high and the appearance characteristics are good. Moreover, this container or container lid is advantageous in that even if the foil thickness is small, a satisfactory shape-retaining property can be obtained.

Figure 7:
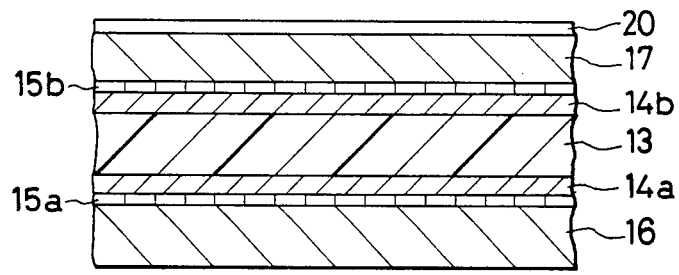
FIG. 7 is a sectional view showing one modification of the laminate suitable for a container or container lid obtained by draw forming, as shown in FIG. 6.

FIG. 7 shows a laminate suitable for a draw-formed container or container lid as well as the laminate shown in FIG. 6. This embodiment is different from the embodiment shown in FIG. 6 in that each of the surface treatment layers 14a and 14b of the iron foil 13 is a plating layer of metallic tin or a tin/iron alloy. This tin-plated steel foil is obtained by cold-rolling a tin-plated steel sheet, and at this rolling step a completely continuous tin/iron alloy layer is formed between the steel substrate and the tin-plated layer and the laminate is especially excellent in the corrosion resistance and the adhesion of the organic resin coating. As in case of the laminate shown in FIG. 6, the inner face coating layer 16 contains titanium dioxide incorporated therein. However, the outer face resin coating layer 17 may contain titanium dioxide incorporated therein as in the laminate shown in FIG. 6 or may not contain titanium dioxide.

Figure 8:
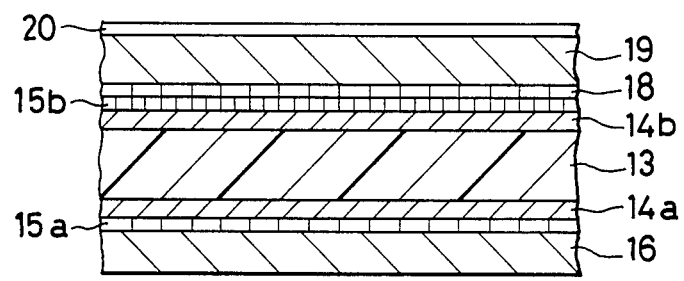
FIG. 8 is a sectional view illustrating a laminate suitable for the production of a sealing pouch to be sterilized.

FIG. 8 shows a laminate suitably used for the production of a retortable pouch, that is, a sealed pouch to be heat-sterilized. As in case of the laminate shown in FIG. 5, surface treatment layers 14a and 14b comprising a nickel-plated layer, a metallic chromium layer and a chromium oxide layer are formed on both the surfaces of the pure iron foil 13. In order to protect the inner face and impart a good heat sealability, a heat-sealable inner face material layer 16 composed of polyethylene or polypropylene is formed on the inner face side through an adhesive layer 15a. A resin film 19 provided with an alluminum-vacuum-deposited layer 18 is bonded to the outer face side through an adhesive layer 14b in such a positional relationship that the vacuum-deposited layer 18 is located on the inner side. A printing ink layer 20 is formed on the outer surface of the film 19.

This laminate has the same advantages as attained in the laminate shown in FIG. 5, and furthermore, since a pure iron foil is used, the tear openability is excellent.

Figure 9:
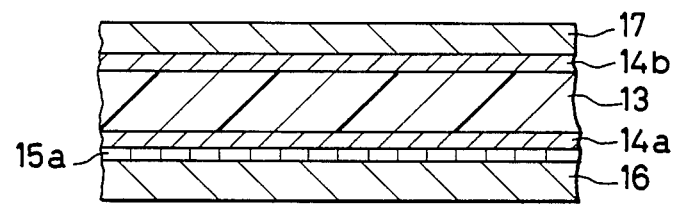
FIG. 9 is a sectional view showing a laminate suitable for the production of a heat-sealable lid.

FIG. 9 shows a laminate suitably used for the production of a heat-sealable lid, especially an easy-open heat-sealable lid. Electrolytic chromate surface treatment layers (a combination of a metallic chromium layer and a chromium oxide layer) 14a and 14b are formed on the surfaces of an iron foil 13. According to need, a heat-sealable inner face-protecting layer 16 composed of polyethylene or polypropylene having titanium dioxide incorporated therein may be formed on the surface treatment layer 14a on the inner face side through an adhesive layer 15a, and a protecting coating layer 17 of a thermosetting epoxy-phenolic lacquer or the like is formed on the outer face side. This protecting coating layer 17 also acts as an adhesive primer and attachment of an opening tab or the like by bonding through a hot adhesive such as a polyamide or copolyester can be facilitated by the presence of the protecting coating layer 17.

The materials used in the present invention will now be described in detail.

The iron foil may be prepared by the electrolytic deposition process or the rolling process. As the material of the iron foil, there can be mentioned pure iron and an iron alloy containing at least one member selected from carbon, nickel, chromium, molybdenum and manganese. When a softness or flexibility is required for the foil substrate, a pure iron foil is used, and when a rigidity necessary for retaining the shape or a sufficient mechanical strength is required, a steel foil is used.

A pure iron foil is obtained by electrolytically depositing iron on the surface of a metal substrate as the cathode from an electrolyte composed mainly of ferrous chloride or ferrous sulfate and peeling the formed film from the surface of the substrate. The purity of the so-obtained iron film is very high (higher than 99.97%) and the film is excellent in corrosion resistance, and the pure iron foil is more ductile than a steel foil. In the texture of the steel foil, crystal grains are elongated in the rolling direction, but the pure iron foil has a columnar crystal texture in which crsytals grow in the thickness direction.

As the steel foil, there are used a ductile steel foil and a full hard steel foil. The former steel foil is prepared by annealing a cold-rolled steel sheet, subjecting the annealed sheet to secondary cold rolling, annealing the sheet again and, if necessary, performing at least one post treatment selected from zinc plating, tin plating, nickel plating, electrolytic chromate treatment and chromate treatment. The latter steel foil is prepared by annealing a cold-rolled sheet, subjecting the annealed sheet to secondary cold rolling and performing a post treatment such as zinc plating, tin plating, nickel plating, electrolytic chromate treatment or chromate treatment. The full hard steel foil provided with a metal-plated layer can also be prepared by annealing a cold-rolled steel sheet, tempering the sheet, plating the sheet with a metal and subjecting the sheet to secondary cold rolling.

Mechanical properties of the ductile steel foil, full hard steel foil and pure iron foil are as follows.

Generally, the ductile steel foil has a tensile force of 30 to 50 kg/mm$^2$ and an elongation of 15 to 35%, the full hard steel foil has a tensile force of 40 to 60 kg/mm$^2$ and an elongation of 1 to 15%, and the pure iron foil has a tensile force of 30 to 50 kg/mm$^2$ and an elongation of 2 to 10%.

A thermosetting resin, a thermoplastic resin or a combination thereof is used as the organic resin coating, and the resin may be applied in the form of a pre-shaped film or a lacquer. Preferred examples of the organic resin are described below, though resins that can be used in the present invention are not limited to those mentioned below.

(a) Polyolefins such as polypropylene, polyethylene, polybutene-1, a propylene/ethylene copolymer, a propylene/butene-1 copolymer, an ethylene/vinyl acetate copolymer and an ion-crosslinked olefin copolymer (ionomer).

(b) Polyamides consisting of recurring units represented by the following general formula:

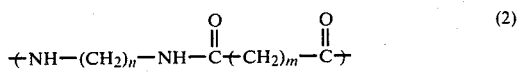

wherein n is a number of 3 to 13 and m is a number of 4 to 11, such as poly-ω-aminocaproic acid, poly-ω-aminoheptanoic acid, poly-ω-aminopelagonic acid, poly-ω-aminodecanoic acid, poly-ω-aminoundecanoic acid, poly-ω-aminododecanoic acid, polyhexamethylene adipamide, polyhexamethylene sebacamide, polyhexamethylene dodecamide, polydecamethylene adipamide, polydecamethylene sebacamide, polydecamethylene dodecamide, polydecamethylene tridecamide, polydodecamethylene adipamide, polydodecamethylene dodecamide, polydodecamethylene tridecamide, polytridecamethylene sebacamide, polytridecamethylene dodecamide, polytridecamethylene tridecamide, polyhexamethylene azelamide, polydodecamethylene azelamide, polytridecamethylene azelamide, and copolyamides thereof.

(c) Polyesters, esepcially polyesters consisting of recurring units represented by the following formula:

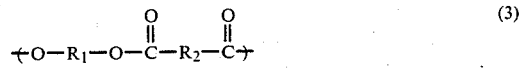

or

wherein R$_1$ stands for an alkylene group having 2 to 6 carbon atoms and R$_2$ stands for an alkylene or arylene group having 2 to 24 carbon atoms, such as polyethylene terephthalate, polyethylene terephthalate/isophthalate, polytetramethylene terephthalate, polyethylene/tetramethylene terephthalate, polytetramethylene terephthalate/isophthalate, polyethylene/tetramethylene terephthalate/isophthalate, polytetramethylene/ethylene terephthalate, polyethylene/tetramethylene terephthalate/isophthalate and polyethylene hydroxybenzoate.

(d) Polycarbonates, especially polycarbonates represented by the following general formula:

wherein R$_3$ stands for a hydrocarbon group having 8 to 15 carbon atoms, such as poly-p-xylene glycol biscarbonate, polydihydroxydiphenylmethane carbonate, polydihydroxydiphenylethane carbonate, polydihydroxydiphenyl-2,2-propane carbonate and polydihydroxydiphenyl-1,1-ethane carbonate.

(e) Vinyl chloride resins such as polyvinyl chloride, vinyl chloride/butadiene copolymers and vinyl chloride/styrene/butadiene copolymers.

(F) Vinylidene chloride resins such as vinylidene chloride/vinyl chloride copolymers and vinylidene chloride/vinylpyridine copolymers.

(g) High nitrile resins such as acrylonitrile/butadiene copolymers having a high nitrile content, acrylonitrile/styrene copolymers having a high nitrile content and acrylonitrile/styrene/butadiene copolymers having a high nitrile content.

(h) Styrene resin such as polystyrene and styrene/butadiene copolymers.

A resin as mentioned above is ordinarily formed into a film, and the film is heat-fusion-bonded to the above-mentioned iron foil or bonded thereto through an adhesive. A urethane type adhesive is excellent as the adhesive for bonding a variety of thermoplastic resin films to the iron foil, and an olefin resin modified with an ethylenically unsaturated carboxylic acid or its anhydride is used as the adhesive for bonding polyolefin films to the iron foil. Furthermore, a low-melting-point copolyamide and a low-melting-point copolyester may be used as adhesives for a polyamide film and a polyester film, respectively.

An organic resin lacquer may be used instead of a thermoplastic resin film as mentioned above. Protecting lacquers comprising a thermosetting or thermoplastic resin may be used as the lacquer. For example, there may be mentioned modified epoxy lacquers such as phenol/epoxy lacquers and amino-epoxy lacquers, vinyl and modified vinyl lacquers such as vinyl chloride/vinyl acetate copolymers, partially saponified vinyl chloride/vinyl acetate copolymers, vinyl chloride/vinyl acetate/maleic anhydride copolymers, epoxy-modified vinyl resin lacquers, epoxyamino-modified vinyl resin lacquers and epoxyphenol-modified vinyl resin lacquers, acryl resin lacquers, and synthetic rubber lacquers such as styrene/butadiene copolymers. Mixtures of two or more of these lacquers can be used.

These organic resins may be applied to a metal substrate in the form of an organic solvent solution such as an enamel or lacquer or an aqueous dispersion or solution by roller coating, spray coating, dip coating, electrostatic coating or electrophoretic coating. Of course, when a thermosetting resin is used, the applied lacquer may be baked according to need.

The packaging material can be used for the production of various sealed packages, for example, for the production of draw-formed containers, pouches, heat-sealable lids, draw-formed container lids and tape tabs and, in each case, various advantages as mentioned above can be attained.

In addition to these advantages, the packaging material of the present invention has an advantage in that the iron foil has a ferromagnetic property not possessed by an aluminum foil. Accordingly, when the packaging material of the present invention is used for heat sealing, since magnetic coupling with a coil is strong at the high frequency induction heating, heating necessary for heat sealing or heat bonding is accomplished in a very short time efficiently.

Figure 3:
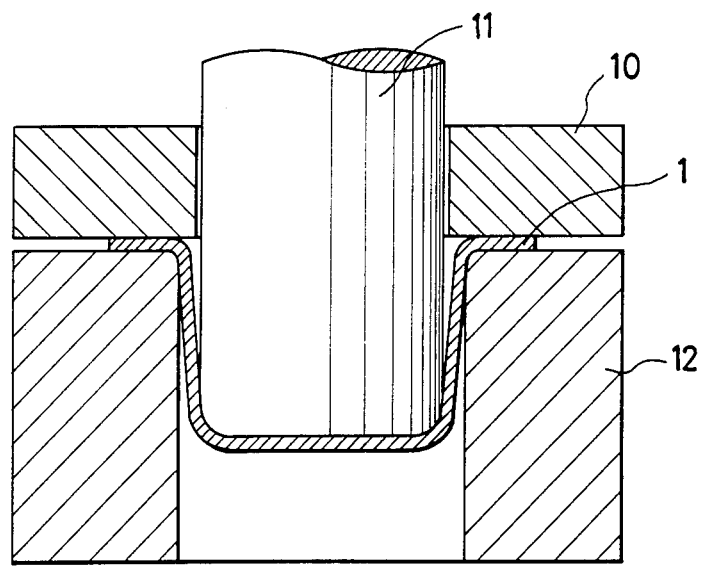
FIG. 3 is a sectional view illustrating the drawing step according to the present invention.

As an important use of the material of the present invention, there can be mentioned a draw-formed container. Referring to FIG. 3 illustrating the draw-forming step, the laminate 1 of the present invention is draw-formed in the state pressed by a wrinkle presser 10 between a punch 11 and a die 12, which are relatively moved to each other in the axial direction. The draw forming may be carried out in one stage or multiple stages. For example, the draw forming may be carried out in several stages while gradually reducing the diameters of the punch 11 and die 12 until a desired shape and a desired height/diameter ratio are obtained. The present invention is characterized in that a seamless cup container can be prepared under such severe conditions that the drawing ratio defined by the ratio of the diameter before processing to the diameter after processing is 1.5 to 2.3 at one draw-forming stage and the entire drawing ratio is 1.5 to 3.5. In short, a seamless cup container can be formed at a high drawing ratio.

The obtained drawn cup is subjected to flanging processing or curling processing to the end edge of the flange portion, whereby a final container is obtained. The container of the present invention can be applied to the use where heat sealing is effected between the container and the lid.

As another example of the container prepared from the material of the present invention, there can be mentioned a vessel having a side seam, which is formed by cutting the above-mentioned laminate in a rectangular shape, curling the cut laminate into a cylindrical form and bonding or welding both the end portions of the cylinder.

The present invention will now be described in detail with reference to the following examples that by no means limit the scope of the invention. In these examples, tests and evaluations were conducted according to the following methods.

1. Drawn Container Formability

An organic resin-coated iron foil was punched into a disc having an outer diameter of 118 mm, and palm oil was coated as a lubricant in an amount of about 1.2 mg/dm$^2$, and the foil was formed into a flanged cup having a diameter of 66 mm and a depth of 32 mm by using a drawing tool of annealed steel, in which the punch diameter was 66 mm, the punch angular radius was 3 mm, the die angular radius was 1 mm and the clearance between the punch and the die was adjusted to 1.2 to 1.8 times the foil thickness by changing the die diameter according to the foil thickness. The wrinkle-controlling pressing force was given by a single acting press of the air cushion system.

After the draw forming, wrinkles formed in the flange portion and the side wall portion near the flange were observed with the naked eye, and the evaluation was made according to the following rating scale.

O: no wrinkles or small wrinkles permissible in view of sealing property and appearance X: many wrinkles not permissible in view of sealing property and appearance After the draw forming, formation of cracks in the side wall portion, abnormal bottom elongation and delinquent form were checked with the naked eye, and the forming state was evaluated based on the results of the naked eye observation.

2. Actual Corrosion Resistance Test

A drawn container that could be normally formed at the above-mentioned test 1 was filled with dressing tuna according to customary procedures, and a lid having the same material structure as that of the container was heat-sealed to the filled container. The container was heat-sterilized under pressure at 116° C. for 30 minutes and was stored at 37° C. for 6 months.

The corrosion resistance was evaluated according to the following rating scale.

(a) Rusting

O: ratio of rusting area was 0 to 5%

X: ratio of rusting area was 6% or higher (b) Peeling of Coating

O: ratio of peeling area was 0 5%
X: ratio of peeling area was 6% or higher

3. Resistance to Falling Shock

A drawn container that could be normally formed at the above-mentioned test 1 was filled with 100 cc of water, and a lid having the same material structure as that of the container was heat-sealed to the filled container. The container was let to fall down on a concrete floor from a height of 30 cm so that the container bottom impinged against the concrete floor. The degree of deformation was checked, and the falling resistance was evaluated according to the following scale.

O: no deformation or slight deformation
X: deformation degrading commercial value

4. Inner Face State

A container was filled with a content and stored at room temperature for 2 years. Then, the container was opened and the content was taken out, and the container was lightly washed with city water. With respect to the inner face of the container, the corrosion state, the state of the organic resin coating were checked by a stereomicroscope.

5. Outer Face State

With respect to the outer face of the container described in the above test 4, the corrosion state and the state of the organic resin coating were observed with the naked eye, and simultaneously, the appearance of the container was evaluated. It was judged that a higher metallic gloss and a lighter hue were better.

6. Rusting on Cut Edge

With respect to the container described in the above test 4, the cut edge was observed by a stereomicroscope and the rusting degree was evaluated according to the following 5-point rating scale.

5: no rusting
4: length of rusting portion was less than 5% of cut edge length
3: length of rusting portion was less than 10% of cut edge length
2: length of rusting portion was less than 30% of cut edge length
1: length of cutting portion was 31% or more of cut edge length

7. Safety of Cut Edge

The end portion of paper having a basis weight of 64 g/m$^2$ was cut by the cut edge on the periphery of a tape tab or the cut edge on the periphery of a heat-sealable lid or retortable pouch and the cut edge formed by opening of the seal, and the degree of safety of the cut edge was evaluated according to the following scale.

5: no break was formed on paper by cut edge portion
4: no break was formed even by moving cut edge portion on paper along more than 10 cm
3: break was formed when cut edge was moved on paper along 5 to 9.9 cm
2: break was formed when cut edge was moved on paper along 1 to 4.9 cm
1: break was formed even if cut edge was moved on paper along less than 1 cm

8. Amount of Generated Hydrogen

When the container described in the above test 4 was opened, the gas in the head space of the container was collected above water, and the amount of hydrogen in the gas was determined by the gas chromatography. Incidentally, the amount of hydrogen is substantially proportional to the quantity of the corrosion of the inner face of the container.

EXAMPLE 1

Polyethylene was laminated in thickness of 20 $\mu$m on both the surfaces of an electrolytically chromate-treated steel foil (the amounts coated of metallic chromium and chromium oxide were 100 mg/m$^2$ and 15 mg/m$^2$, respectively) having a thickness of 30 $\mu$m and a tensile force of 35 kgf/mm$^2$ through a urethane type adhesive having a thickness 3 $\mu$m, to obtain an organic resin-coated steel foil comprising organic resin coatings in a total thickness of 46 $\mu$m.

A flanged cup having a diameter of 66 mm and a depth of 32 mm was formed from the so-obtained organic resin-coated steel foil, and the drawn container formability, actual corrosion resistance and falling resistance were exmained. The obtained results are shown in Table 1.

EXAMPLES 2 AND 3

Cups were formed and tested in the same manner as described in Example 1 except that the thickness of the polyethylene on the inner face side of the container was changed to 130 or 210 $\mu$m and the total organic resin coating thickness was changed to 156 or 236 $\mu$m. The obtained results are shown in Table 1.

COMAPRATIVE EXAMPLES 1 AND 2

Cups were formed and tested in the same manner as described in Example 1 except that the thickness of the polyethylene on the inner face side of the container was changed to 230 or 320 $\mu$m and the total organic resin coating thickness was changed to 256 or 346 $\mu$m. The obtained results are shown in Table 1.

EXAMPLE 4

An epoxy-phenolic lacquer was coated and baked at 230° C. for 30 seconds on one surface of an electrolytically chromate-treated steel foil (the amounts coated of metallic chromium and chromium oxide were 100 mg/m$^2$ and 15 mg/m$^2$, respectively), having a thickness of 30 $\mu$m and a tensile force of 60 kgf/mm$^2$ so that the thickness of the coating after baking was 5 $\mu$m.

Then, a copolyester was laminated in a thickness of 25 $\mu$m on the uncoated surface of the steel foil through a urethane type adhesive having a thickness of 3 $\mu$m to obtain an organic resin-coated steel foil comprising organic resin coatings having a total thickness of 33 $\mu$m. In the ame manner as described in Example 1, a flanged cup having a copolyester coating layer on the inner face was formed and the cup was tested. The obtained results are shown in Table 1.

EXAMPLE 5 AND COMPARATIVE EXAMPLES 3 AND 4

Cups were prepared and tested in the same manner as described in Example 4 except that the thickness of the copolyester on the inner face side of the container was changed to 130, 150 or 260 $\mu$m and the total organic resin coating thickness was changed to 138, 158 or 268 $\mu$m. The obtained results are shown in Table 1.

EXAMPLE 6

Polypropylene was laminated in a thickness of 20 μm on one surface of a tin-plated steel foil (the amount deposited of tin was 2800 mg/m$^2$) having a thickness of 30 μm and a tensile force of 85 kgf/mm$^2$ through a urethane type adhesive having a thickness of 3 μm, and a nylon was laminated in a thickness of 20 μm on the other surface of the steel foil through a urethane type adhesive having a thickness of 3 mm, to obtain an organic resin-coated steel foil having a total organic resin coating thickness of 46 μm. In the same manner as described in Example 1, a flanged cup having a polypropylene coating layer on the inner face side was formed from the so-obtained organic resin-coated steel foil and the cup was tested. The obtained results are shown in Table 1.

EXAMPLE 7 AND COMPARATIVE EXAMPLES 5 AND 6

Cups were formed and tested in the same manner as described in Example 6 except that the thickness of the polypropylene on the inner face side of the container was changed to 70, 90 or 130 μm and the total organic resin coating thickness was changed to 96, 116 or 156 μm. The obtained results are shown in Table 1.

COMPARATIVE EXAMPLE 7

A cup was formed and tested in the same manner as described in Example 6 except that the tensile force of the tin-plated steel foil was 28 kgf/mm$^2$. The obtained results are shown in Table 1.

EXAMPLE 8

Polypropylene was laminated in a thickness of 20 μm on one surface of an electrolytically chromate-treated steel foil (the amounts coated of metallic chromium and chromium oxide were 200 mg/m$^2$ and 8 mg/m$^2$, respectively) having a thickness of 75 μm and a tensile force of 36 kgf/mm$^2$ through a urethane type adhesive having a thickness of 3 mm, and a nylon was laminated in a thickness of 20 μm on the other surface of the steel foil through a urethane type adhesive having a thickness of 3 μm, to obtain an organic resin-coated steel foil having a total organic resin coating thickness of 46 μm. In the same manner as described in Example 1, a flanged cup having a polypropylene coating layer on the inner face side was formed from the so-obtained organic resin-coated steel foil and the cup was tested. The obtained results are shown in Table 1.

EXAMPLES 9 AND 10 AND COMPARATIVE EXAMPLES 8 AND 9

Cups were formed and tested in the same manner as described in Example 8 except that the thickness of the polypropylene on the inner face side of the container was changed to 140, 230, 260 or 340 μm and the total organic resin coating thickness was changed to 166, 256, 286 or 366 μm. The obtained results are shown in Table 1.

EXAMPLE 11

An epoxy-urea lacquer was coated and baked at 230° C. for 30 minutes on one surface of an electrolytically chromate-treated steel foil (the amounts coated of metallic chromium and chromium oxide were 200 mg/m$^2$ and 8 mg/m$^2$, respectively) having a thickness of 75 μm and a tensile force of 60 kgf/mm$^2$ so that the thickness of the coating after baking was 5 μm. Then, polyethylene was laminated in a thickness of 30 μm on the uncoated surface of the steel foil through a urethane type adhesive having a thickness of 3 μm, to obtain an organic resin-coated steel foil having a total organic resin coating thickness of 38 μm. In the same manner as described in Example 1, a flanged cup having a polyethylene coating layer on the inner face side was formed from the so-obtained organic resin-coated steel foil and the cup was tested. The obtained results are shown in Table 1.

EXAMPLES 12 and 13 AND COMPARATIVE EXAMPLE 10

Cups were formed and tested in the same manner as described in Example 11 except that the thickness of the polyethylene on the inner face side of the container was changed to 100, 150 or 170 μm and the total organic resin coating thickness was changed to 108, 158 or 178 μm. The obtained results are shown in Table 1.

EXAMPLE 14

A vinyl chloride lacquer was coated and dried at 200° C. for 4 seconds on both the surfaces of a nickel-plated steel foil (the amount deposited of metallic nickel was 1500 mg/m$^2$) having a thickness of 75 μm and a tensile force of 83 kgf/mm$^2$ so that the thicknesses of the coatings after drying were 3 μm and 1 μm, respectively, to obtain an organic resin-coated steel foil having a total organic resin coating thickness of 4 μm. In the same manner as described in Example 1, a flanged cup having a vinyl chloride resin layer having a thickness of 3 μm on the inner face side was formed from the so-obtained organic resin-coated steel foil and the cup was tested. The obtained results are shown in Table 1.

COMPARATIVE EXAMPLE 11

A cup was formed and tested in the same manner as described in Example 14 except that the thickness of the vinyl chloride resin coating on the inner face side of the container was 1.5 μm and the outer face side was not coated at all. The obtained results are shown in Table 1.

EXAMPLE 15

A vinyl chloride resin lacquer was coated and dried at 200° C. for 40 seconds on one surface of the same nickel-plated steel foil as used in Example 14 so that the thickness of the coating after drying was 8 μm. then, polypropylene was laminated in a thickness of 100 μm on the other surface of the steel foil through a urethane type adhesive having a thickness of 3 μm, to obtain an orgaic resin-coated steel foil having a total organic resin coating thickness of 111 μm. In the same manner as described in Example 1, a flanged cup having a vinyl chloride coating layer on the inner face side was formed from the organic resin-coated steel foil and the cup was tested. The obtained results are shown in Table 1.

COMPARATIVE EXAMPLES 12 AND 13

Cups were formed and tested in the same manner as described in Example 15 except that the thickness of the polypropylene on the outer face side of the container was changed to 120 or 160 μm. The obtained results are shown in Table 1.

COMPARATIVE EXAMPLE 14

A cup was formed and tested in the same manner as described in Example 15 except that the tensile force of the nickel-plated steel was 105 kgf/mm².

EXAMPLE 16

A copolyester was laminated in a thickness of 20 μm on one surface of an electrolytically chromate-treated steel foil (the amounts coated of metallic chromium and chromium oxide were 50 mg/m² and 25 mg/², respectively) having a thickness of 120 μm and a tensile force of 35 kgf/mm² through a urethane type adhesive having a thickness of 3 μm, and a polyester was laminated in a thickness of 20 μm on the other surface of the steel foil through a urethane type adhesive having a thickness of 3 μm, to obtain an organic resin-coated steel foil having a total organic resin coating thickness of 46 μm. In the same manner as described in Example 1, a flanged cup having a polyester coating layer on the inner face side was formed from the so-obtained organic resin-coated steel foil and the cup was tested. The obtained results are shown in Table 1.

EXAMPLES 17, 18 AND 19 AND COMPARATIVE EXAMPLES 15 AND 16

Cups were formed and tested in the same manner as described in Example 16 except that the thickness of the copolyester on the inner face side of the container was changed to 130, 230, 280, 300 or 380 μm and the total organic resin coating thickness was changed to 156, 256, 306, 326 or 406 μm. The obtained results are shown in Table 1.

EXAMPLE 20

A vinyl chloride/vinyl acetate copolymer was coated on one surface of an electrolytically chromate-treated steel foil (the amounts coated of metallic chromium and chromium oxide were 50 mg/m² and 25 mg/m², respectively) having a thickness of 120 μm and a tensile force of 58 kgf/mm² so that the thickness of the coating after drying was 3 μm and a vinyl chloride resin lacquer was coated on the other surface of the steel foil so that the thickness of the coating after drying was 1 μm, and the coated steel foil was dried at 200° C. for 40 seconds, to obtain an orgaic resin-coated steel foil having a total organic resin coating thickness of 4 lm. In the same manner as described in Example 1, a flanged cup having a vinyl chloride/vinyl acetate copolymer coating on the inner face side was formed from the so-obtained organic resin-coated steel foil and the cup was tested. The obtained results are shown in Table 1.

COMPARATIVE EXAMPLE 17

A cup was formed and tested in the same manner as described in Example 20 except that the thickness of the vinyl chloride/vinyl acetate copolymer coated on the inner face side of the container was changed to 1.5 μm and the outer face side was not coated at all. The obtained results are shown in Table 1.

EXAMPLE 21

A vinyl chloride/vinyl acetate copolymer was coated and dried at 200° C. for 40 seconds on one surface of the same electrolytically chromate-treated steel foil as used in Example 20 so that the thickness of the coating after drying was 8 μm, and polypropylene was laminated in a thickness of 90 μm on the other surface of the steel foil through a urethane type adhesive having a thickness of 3 μm, to obtain an organic resin-coated steel foil having a total organic resin coating thickness of 101 μm. In the same manner as described in Example 1, a flanged cup having a vinyl chloride/vinyl acetate copolymer coating on the inner face side was formed from the so-obtained organic resin-coated steel foil and the cup was tested. The obtained results are shown in Table 1.

EXAMPLE 22 AND COMPARATIVE EXAMPLES 18 AND 19

Cups were formed and tested in the same manner as described in Example 21 except that the thickness of the polypropylene on the outer face side of the container was changed to 170, 190 or 280 μm and the total organic resin coating thickness was changed to 181, 201 or 291 μm. The obtained results are shown in Table 1.

EXAMPLE 23

Polyethylene was laminated in a thickness of 20 μm on one surface of an electrolytically chromate-treated steel foil (the amounts coated of metallic chromium and chromium oxide were 120 mg/m² and 10 mg/m², respectively) having a thickness of 120 μm and a tensile force of 87 kgf/mm² through a urethane type adhesive having a thickness of 3 μm, and a nylon was laminated in a thickness of 20 μm on the other surface of the steel foil through the same adhesive as described above, having a thickness of 3 μm, to obtain an organic resin-coated steel foil having a total organic resin coating thickness of 46 μm. In the same manner as described in Example 1, a flanged cup having a polyethylene coating layer on the inner side of the container was formed from the so-obtained organic resin-coated steel foil and the cup was tested. The obtained results are shown in Table 1.

EXAMPLE 24 AND COMPARATIVE EXAMPLES 20 AND 21

Cups were formed and tested in the same manner as described in Example 23 except that the thickness of the polyethylene on the inner face side of the container was changed to 90, 110 or 200 μm and the total organic resin coating thickness was changed to 116, 136 or 226 μm. The obtained results are shown in Table 1.

COMPARATIVE EXAMPLE 22

A cup was formed and tested in the same manner as described in Example 24 except that the tensile force of the electrolytically chromate-treated steel foil was 105 kgf/mm². The obtained results are shown in Table 1.

EXAMPLE 25

Polypropylene was laminated in a thickness of 40 μm on one surface of an electrolytically chromate-treated steel foil (the amounts coated of metallic chromium and chromium oxide 100 mg/m² and 20 mg/m², respectively) having a thickness of 75 μm and a tensile force of 60 kgf/mm² through a urethane type adhesive having a thickness of 3 μm, and a nylon was laminated in a thickness of 30 μm on the other surface of the steel foil through the same adhesive as described above, having a thickness of 3 μm, to obtain an organic resin-coated steel foil having a total organic resin coating thickness of 76 μm. In the same manner as described in Example 1, a flanged cup having a polypropylene layer on the inner face side was formed from the so-obtained organic

TABLE 1

| | Steel Foil | | | Organic Resin Coating | | | | | Drawn Container Formability | | Actual Corrosion Resistance Test | | Resistance to Falling Shock |
|---|---|---|---|---|---|---|---|---|---|---|---|---|---|
| | thickness T (μm) | tensile force σB (kgf/mm²) | surface treatment | inner face side of container | | outer face side of container | | total thickness t (μm) (inclusive of that of adhesive layer) | wrinkles in flange | forming state | rusting | peeling of coating | |
| | | | | kind | thickness (μm) | kind | thickness (μm) | | | | | | |
| Example 1 | 30 | 35 | electrolytic chromate treatment | polyethylene | 20 | polyethylene | 20 | 46 | | normal | | | |
| Example 2 | 30 | 35 | electrolytic chromate treatment | polyethylene | 130 | polyethylene | 20 | 156 | | normal | | | |
| Example 3 | 30 | 35 | electrolytic chromate treatment | polyethylene | 210 | polyethylene | 20 | 236 | | normal | | | |
| Comparative Example 1 | 30 | 35 | electrolytic chromate treatment | polyethylene | 230 | polyethylene | 20 | 256 | | abnormal bottom elongation | | | |
| Comparative Example 2 | 30 | 35 | electrolytic chromate treatment | polyethylene | 320 | polyethylene | 20 | 346 | × | delinquent form | | | |
| Example 4 | 30 | 60 | electrolytic chromate treatment | copolyester | 25 | epoxy-phenolic lacquer | 5 | 33 | | normal | × | × | |
| Example 5 | 30 | 60 | electrolytic chromate treatment | copolyester | 130 | epoxy-phenolic lacquer | 5 | 138 | | normal | × | × | |
| Comparative Example 3 | 30 | 60 | electrolytic chromate treatment | copolyester | 150 | epoxy-phenolic lacquer | 5 | 158 | | normal | × | × | |
| Comparative Example 4 | 30 | 60 | electrolytic chromate treatment | copolyester | 260 | epoxy-phenolic lacquer | 5 | 268 | × | delinquent form | | | |
| Example 6 | 30 | 85 | tin plating | polypropylene | 20 | nylon | 20 | 46 | | normal | | | |
| Example 7 | 30 | 85 | tin plating | polypropylene | 70 | nylon | 20 | 96 | | normal | | | |
| Comparative Example 5 | 30 | 85 | tin plating | polypropylene | 90 | nylon | 20 | 116 | | normal | × | × | |
| Comparative Example 6 | 30 | 85 | tin plating | polypropylene | 130 | nylon | 20 | 156 | × | delinquent form | | | |
| Comparative Example 7 | 30 | 28 | tin plating | polypropylene | 70 | nylon | 20 | 96 | | normal | | | |
| Example 8 | 75 | 36 | electrolytic chromate treatment | polypropylene | 20 | nylon | 20 | 46 | | normal | | | |
| Example 9 | 75 | 36 | electrolytic chromate treatment | polypropylene | 140 | nylon | 20 | 166 | | normal | | | |
| Example 10 | 75 | 36 | electrolytic chromate treatment | polypropylene | 230 | nylon | 20 | 256 | | normal | | | |
| Comparative Example 8 | 75 | 36 | electrolytic chromate treatment | polypropylene | 260 | nylon | 20 | 286 | | normal | × | × | |
| Comparative Example 9 | 75 | 36 | electrolytic chromate treatment | polypropylene | 340 | nylon | 20 | 366 | × | delinquent form | | | |
| Example 11 | 75 | 60 | electrolytic chromate treatment | polyethylene | 30 | epoxy-urea lacquer | 5 | 38 | | normal | | | |
| Example 12 | 75 | 60 | electrolytic chromate treatment | polyethylene | 100 | epoxy-urea lacquer | 5 | 108 | | normal | | | |
| Example 13 | 75 | 60 | electrolytic chromate treatment | polyethylene | 150 | epoxy-urea lacquer | 5 | 158 | | normal | | | |
| Comparative Example 10 | 75 | 60 | electrolytic chromate treatment | polyethylene | 170 | epoxy-urea lacquer | 5 | 178 | | normal | × | × | |
| Comparative Example 11 | 75 | 83 | nickel plating | vinyl chloride lacquer | 1.5 | no coating | — | 1.5 | | normal | × | × | × | resin-coated steel foil and the cup was tested. The obtained results are shown in Table 1.

EXAMPLES 26 AND 27 AND COMPARATIVE EXAMPLES 23, 24 AND 25

Cups were formed and tested in the same manner as described in Example 25 except that as the steel foil, there were used a nickel-plated steel foil (the amount deposited of metallic nickel was 800 mg/m$^2$) (Example 26), a tin-plated steel foil (the amounts coated of metallic tin and chromium oxide were 1000 mg/m$^2$ and 8 mg/m$^2$, respectively) (Example 27), an untreated steel foil (Comparative Example 23), a chromate-treated steel foil (the amounts coated of metallic chromium and chromium oxide were 0 mg/m$^2$ and 5 mg/m$^2$, respectively) (Comparative Example 24) and a phosphate/chromate-treated steel foil (the amounts coated of metallic chromium and chromium oxide were 0 mg/m$^2$ and 7 mg/m$^2$, respectively) (Comparative Example 25). The obtained results are shown in Table 1. It is seen that electrolytically chromate-treated steel foil, nickel-plated steel foil and tin-plated steel foil give a higher corrosion resistance than untreated steel foil, chromate-treated steel foil and phosphate/chromate-treated steel foil.

TABLE 1-continued

| | Steel Foil | | | Organic Resin Coating | | | | | | Drawn Container Formability | | Actual Corrosion Resistance Test | | Resistance to Falling Shock |
|---|---|---|---|---|---|---|---|---|---|---|---|---|---|---|
| | thickness T (μm) | tensile force σB (kgf/mm²) | surface treatment | inner face side of container | | outer face side of container | | total thickness t (μm) (inclusive of that of adhesive layer) | | wrinkles in flange | forming state | rusting | peeling of coating | |
| | | | | kind | thickness (μm) | kind | thickness (μm) | | | | | | | |
| Example 14 | 75 | 83 | nickel plating | vinyl chloride lacquer | 3 | vinyl chloride lacquer | 1 | 4 | | | normal | | | |
| Example 15 | 75 | 83 | nickel plating | vinyl chloride lacquer | 8 | polypropylene | 100 | 111 | | | normal | | | |
| Comparative Example 12 | 75 | 83 | nickel plating | vinyl chloride lacquer | 8 | polypropylene | 120 | 131 | | | normal | × | × | |
| Comparative Example 13 | 75 | 83 | nickel plating | vinyl chloride lacquer | 8 | polypropylene | 120 | 131 | | | normal | × | × | |
| Comparative Example 13 | 75 | 83 | nickel plating | vinyl chloride lacquer | 8 | polypropylene | 160 | 171 | × | delinquent form | × | × | |
| Comparative Example 14 | 75 | 105 | nickel plating | vinyl chloride lacquer | 8 | polypropylene | 100 | 111 | × | cracking in side wall | — | — | — |
| Example 16 | 120 | 35 | electrolytic chromate treatment | polyester copolymer | 20 | polyester | 20 | 46 | | | normal | | | |
| Example 17 | 120 | 35 | electrolytic chromate treatment | polyester copolymer | 130 | polyester | 20 | 156 | | | normal | | | |
| Example 18 | 120 | 35 | electrolytic chromate treatment | polyester copolymer | 230 | polyester | 20 | 256 | | | normal | | | |
| Example 19 | 120 | 35 | electrolytic chromate treatment | polyester copolymer | 280 | polyester | 20 | 306 | | | normal | | | |
| Comparative Example 15 | 120 | 35 | electrolytic chromate treatment | polyester copolymer | 300 | polyester | 20 | 326 | | | normal | × | × | |
| Comparative Example 16 | 120 | 35 | electrolytic chromate treatment | polyester copolymer | 380 | polyester | 20 | 406 | × | delinquent form | × | × | |
| Comparative Example 17 | 120 | 58 | electrolytic chromate treatment | vinyl chloride/vinyl acetate copolymer | 1.5 | no coating | — | 1.5 | | | normal | × | × | |
| Example 20 | 120 | 58 | electrolytic chromate treatment | vinyl chloride/vinyl acetate copolymer | 3 | vinyl chloride lacquer | 1 | 4 | | | normal | | | |
| Example 21 | 120 | 58 | electrolytic chromate treatment | vinyl chloride/vinyl acetate copolymer | 8 | polypropylene | 90 | 101 | | | normal | | | |
| Example 22 | 120 | 58 | electrolytic chromate treatment | vinyl chloride/vinyl acetate copolymer | 8 | polypropylene | 170 | 181 | | | normal | | | |
| Comparative Example 18 | 120 | 58 | electrolytic chromate treatment | vinyl chloride/vinyl acetate copolymer | 8 | polypropylene | 190 | 201 | | | normal | × | × | |
| Comparative Example 19 | 120 | 58 | electrolytic chromate treatment | vinyl chloride/vinyl acetate copolymer | 8 | polypropylene | 280 | 291 | | | normal | × | × | |
| Example 23 | 120 | 87 | electrolytic chromate treatment | polyethylene | 20 | nylon | 20 | 46 | | | normal | | | |
| Example 24 | 120 | 87 | electrolytic chromate treatment | polyethylene | 90 | nylon | 20 | 116 | | | normal | | | |

TABLE 1-continued

| | Steel Foil | | | Organic Resin Coating | | | | | Drawn Container Formability | | Actual Corrosion Resistance Test | | Resistance to Falling Shock |
|---|---|---|---|---|---|---|---|---|---|---|---|---|---|
| | | | | inner face side of container | | outer face side of container | | total thickness t (μm) (inclusive of that of adhesive layer) | wrinkles in flange | forming state | rusting | peeling of coating | |
| | thickness T (μm) | tensile force σB (kgf/mm²) | surface treatment | kind | thickness (μm) | kind | thickness (μm) | | | | | | |
| Comparative Example 20 | 120 | 87 | electrolytic chromate treatment | polyethylene | 110 | nylon | 20 | 136 | | normal | x | x | |
| Comparative Example 21 | 120 | 87 | electrolytic chromate treatment | polyethylene | 200 | nylon | 20 | 226 | x | delinquent form | x | x | |
| Comparative Example 22 | 120 | 105 | electrolytic chromate treatment | polyethylene | 90 | nylon | 20 | 116 | x | cracking in side wall | — | — | — |
| Example 25 | 75 | 60 | electrolytic chromate treatment | polypropylene | 40 | nylon | 30 | 76 | | normal | | | |
| Example 26 | 75 | 60 | nickel plating | polypropylene | 40 | nylon | 30 | 76 | | normal | | | |
| Example 27 | 75 | 60 | tin plating | polypropylene | 40 | nylon | 30 | 76 | | normal | | | |
| Comparative Example 23 | 75 | 60 | untreated | polypropylene | 40 | nylon | 30 | 76 | | normal | x | x | |
| Comparative Example 24 | 75 | 60 | chromate treatment | polypropylene | 40 | nylon | 30 | 76 | | normal | x | x | |
| Comparative Example 25 | 75 | 60 | phosphate/chromate treatment | polypropylene | 40 | nylon | 30 | 76 | | normal | x | x | |

EXAMPLE 28

A rolled steel foil having a thickness of 70 μm and a tensile force of 40 kgf/mm² was cathodically electrolyzed in an electrolytic chromate treatment bath to form a metallic chromium layer having a thickness corresponding to 0.1 g/m² and a chromium oxide layer having a thickness corresponding to 15 mg/m² on both the surfaces. By using a urethane type adhesive, a polypropylene film containing titanium white in an amount of 10 g/m² and having a thickness of 70 μm was laminated on the inner face side of the container and a polypropylene film containing titanium white in an amount of 5 g/m² and having a thickness of 40 μm was laminated on the outer face side of the container. The so-obtained organic resin-coated steel foil was formed into a cylindrical draw-formed flanged cup having a bottom diameter of 66 mm and a height of 32 mm by using a press. The top end of the flange portion was curled so that the cut edge portion was hidden.

Nickel was plated in an amount of 2.0 g/m² on both the surfaces of a rolled steel foil having a thickness of 40 μm in a Watts bath and the plated steel foil was cathodically electrolyzed in an electrolytic chromate treatment bath to form a metallic chromium layer having a thickness corresponding to 0.05 g/m² and a chromium oxide layer having a thickness corresponding to 15 mg/m². A titanium white-containing epoxy-phenolic lacquer was coated on one surface of the chromate-treated steel foil so that the thickness of the coating after drying was 5 μm (the amount of titanium was 5 g/m²), and the coating was baked at 250° C. for 30 seconds. A polypropylene film containing titanium white in an amount of 6 g/m² and having a thickness of 40 μm was laminated on the other surface of the steel foil by using a urethane type adhesive. The so-obtained organic resin-coated steel foil was punched into a disc having a diameter of 70 mm and a triangular knob portion formed on the periphery to obtain a heat-sealable lid.

The draw-formed cup was filled with tuna dressing and the lid was heat-sealed to the cup, and heat sterilization was carried out at 116° C. for 40 minutes. The cup was stored at room temperature for 2 hours, and the states of the inner faces and outer faces of the draw-formed cup and the lid, the rusting state of the cut edge portion of the lid and the safety of the cut edge portion were evaluated and the amount of generated hydrogen in the head space was measured. The obtained results are shown in Table 2.

EXAMPLES 29, 30 AND 31 AND COMPARATIVE EXAMPLES 26 AND 27

Cup containers were formed and tested in the same manner as described in Example 28 except that in the draw-formed cup, the amount of titanium white in the organic resin coating on the inner face side was changed to 5, 1, 0.5, 0.2 or 0 g/m² and the amount of titanium white in the organic resin coating on the outer face side was changed to 3, 1, 0.5, 0.2 or 0 g/m². The obtained results are shown in Table 2.

EXAMPLES 32, 33 AND 34 AND COMPARATIVE EXAMPLE 28

Cup containers were formed and tested in the same manner as described in Example 28 except that the amount coated of chromium oxide on the steel foil of the draw-formed cup by the electrolytic chromate treatment was changed 10 mg/m², a polypropylene film containing 10 g/m² of titanium white and having a thickness of 90, 90, 95 or 100 μm was used as the inner face organic resin coating of the draw-forming cup, a polypropylene film containing 10 g/m² of titanium white and having a thickness of 60, 80, 95 or 100 μm was used as the outer face organic resin coating of the draw-formed cup, the amount plated of nickel in the lid was changed to 1.0 g/m², the amount coated of chromium in the lid was changed to 0.07 g/m², the amount coated of chromium oxide in the lid was changed to 10 mg/m², a polypropylene film containing 6 g/m² of titanium white and having a thickness of 25, 15, 10 or 10 μm was used as the organic resin coating on the inner face side of the lid and a polypropylene film containing 5 g/m² of titanium white and having a thickness of 5, 5, 5 or 1 μm was used as the organic resin coating on the outer face side of the lid. The obtained results are shown in Table 2.

EXAMPLE 35

A rolled steel foil having a thickness of 50 μm was cathodically electrolyzed in an electrolytic chromate treatment bath to form a metallic chromium layer having a thickness corresponding to 0.15 g/m² and a chromium oxide layer having a thickness corresponding to 20 mg/m² on both the surfaces of the steel foil. By using a urethane type adhesive, a polypropylene film containing 10 g/m² of titanium white and having a thickness of 50 μm was laminated on the inner face side of the container and a polypropylene film containing 5 g/m² of titanium white and having a thickness of 30 μm was laminated on the outer face side of the container. The so-obtained organic resin-coated steel foil was formed into a draw-formed cup in the same manner as described in Example 28.

Nickel was plated in an amount of 12 g/m² on both the surfaces of a rolled steel foil having a thickness of 100 μm in a Watts bath, and then chromium oxide was coated in an amount of 20 mg/m² on both the surfaces of the steel foil by the cathodic electrolysis in a chromate treatment bath. A titanium white-containing epoxy-phenolic lacquer was coated on one surface of the steel foil so that the thickness of the coating after drying was 5 μm and the amount of titanium white was 5 g/m² and the coating was baked at 250° C. for 30 seconds. A polypropylene film containing 6 g/m² of titanium white and having a thickness of 30 μm was laminated on the other surface of the steel foil by using a urethane type adhesive. A heat-sealable lid was formed from the so-obtained organic resin-coated steel foil in the same manner as described in Example 28.

A cup container was formed from the so-obtained cup and lid and tested in the same manner as described in Example 28. The obtained results are shown in Table 2.

EXAMPLES 36 AND 37 AND COMPARATIVE EXAMPLE 29

Cup containers were formed and tested in the same manner as described in Example 35 except that the thickness of the steel foil of the heat-sealable lid was changed to 110, 120 or 130 μm. The obtained results are shown in Table 2.

COMPARATIVE EXAMPLE 30

A cup container was formed and tested in the same manner as described in Example 35 except that aluminum foils having thicknesses of 120 and 100 μm were used as the foils of the draw-formed cup and the lid, respectively. The obtained results are shown in Table 2.

EXAMPLE 38

A rolled steel foil having a thickness of 50 μm was cathodically electrolyzed in an electrolytic chromate treatment bath to form a metallic chromium layer having a thickness corresponding to 0.3 g/m² and a chromate layer having a thickness corresponding to 20 mg/m² on both the surfaces of the steel foil. By using a urethane type adhesive, a polypropylene film containing 10 g/m² of titanium white and having a thickness of 50 μm was laminated on the inner face side of the container and a polypropylene film containing 5 g/m² of titanium white and having a thickness of 4 μm was laminated on the outer face side of the container. A draw-formed cup was prepared from the so-obtained organic resin-coated steel foil in the same manner as described in Example 28.

Nickel was plated in an amount of 3 g/m² on both the surfaces of a rolled steel foil having a thickness of 50 μm in a Watts bath, and a chromate layer having a thickness corresponding to 10 mg/m² was formed on both the surfaces of the steel foil by the cathodic electrolysis treatment in a chromate treatment bath. A titanium white-containing epoxy-phenolic lacquer was coated on one surface of the steel foil so that the thickness of the coating after drying was 5 μm and the amount of titanium white was 5 g/m², and the coating was baked at 250° C. for 30 seconds. A polypropylene film containing 6 g/m² of titanium white and having a thickness of 40 μm was laminated on the other surface of the steel foil by using a urethane type adhesive. A heat-sealable lid was formed form the so-obtained organic resin-coated steel foil in the same manner as described in Example 28.

A cup container was formed from the so-obtained cup and lid and tested in the same manner as described in Example 28. The obtained results are shown in Table 2.

EXAMPLES 39, 40 AND 41 AND COMPARATIVE EXAMPLES 31 AND 32

Cup containers were formed and tested in the same manner as described in Example 38 except that the amount plated of chromium in the draw-formed cup was changed to 0.5, 0.06, 0.04, 0.02 or 0.6 g/m². The obtained results are shown in Table 2.

EXAMPLE 42

A cup container was formed and tested in the same manner as described in Example 38 except that a rolled steel foil preliminarily plated with 0.8 g/m² of tin was used as the foil for each of the draw-formed cup and the lid and a titanium white-free polypropylene film was used as the outer face organic resin coatings of the draw-formed cup and the lid. The obtained results are shown in Table 2.

TABLE 2

| | Drawn Container and Lid | Foil kind | Foil thickness (μm) | Surface Treatment — metal plating kind | Surface Treatment — metal plating thickness (g/m²) | Surface Treatment — amount of chromate (mg/m²) | Inner Face Organic Coating — organic resin kind | Inner Face Organic Coating — organic resin thickness (μm) | Inner Face Organic Coating — metal or inorganic pigment kind | Inner Face Organic Coating — metal or inorganic pigment amount (g/m²) | Outer Face Organic Coating — organic resin kind | Outer Face Organic Coating — organic resin thickness (μm) | Outer Face Organic Coating — metal or inorganic pigment kind | Outer Face Organic Coating — metal or inorganic pigment amount (g/m²) | Total Organic Coating Thickness (μm) Inclusive of That of Adhesive Layer |
|---|---|---|---|---|---|---|---|---|---|---|---|---|---|---|---|
| Example 28 | drawn container | steel | 70 | chromium | 0.1 | 15 | polypropylene | 70 | titanium white | 10 | polypropylene | 40 | titanium white | 5 | 116 |
| | lid | steel | 40 | nickel (lower layer) chromium (upper layer) | 2.0 / 0.05 | 15 | polypropylene | 40 | titanium white | 6 | epoxy-phenolic resin | 5 | titanium white | 5 | 48 |
| Example 29 | drawn container | steel | 70 | chromium | 0.1 | 15 | polypropylene | 70 | titanium white | 5 | polypropylene | 40 | titanium white | 3 | 116 |
| | lid | steel | 40 | nickel (lower layer) chromium (upper layer) | 2.0 / 0.05 | 15 | polypropylene | 40 | titanium white | 6 | epoxy-phenolic resin | 5 | titanium white | 5 | 48 |
| Example 30 | drawn container | steel | 70 | chromium | 0.1 | 15 | polypropylene | 70 | titanium white | 1 | polypropylene | 40 | titanium white | 1 | 116 |
| | lid | steel | 40 | nickel (lower layer) chromium (upper layer) | 2.0 / 0.5 | 15 | polypropylene | 40 | titanium white | 6 | epoxy-phenolic resin | 5 | titanium white | 4 | 48 |
| Example 31 | drawn container | steel | 70 | chromium | 0.1 | 15 | polypropylene | 70 | titanium white | 0.5 | polypropylene | 40 | titanium white | 0.5 | 116 |
| | lid | steel | 40 | nickel (lower layer) chromium (upper layer) | 2.0 / 0.05 | 15 | polypropylene | 40 | titanium white | 6 | epoxy-phenolic resin | 5 | titanium white | 5 | 48 |
| Comparative Example 26 | drawn container | steel | 70 | chromium | 0.1 | 15 | polypropylene | 70 | titanium white | 0.2 | polypropylene | 40 | titanium white | 0.2 | 116 |
| | lid | steel | 40 | nickel (lower layer) chromium (upper layer) | 2.0 / 0.05 | 15 | polypropylene | 40 | titanium white | 6 | epoxy-phenolic resin | 5 | titanium white | 5 | 48 |
| Comparative Example 27 | drawn container | steel | 70 | chromium | 0.1 | 15 | polypropylene | 70 | titanium white | 0 | polypropylene | 40 | titanium white | 0 | 116 |
| | lid | steel | 40 | nickel (lower layer) chromium (upper layer) | 2.0 / 0.05 | 15 | polypropylene | 40 | titanium white | 6 | epoxy-phenolic resin | 5 | titanium white | 5 | 48 |
| Example 32 | drawn container | steel | 70 | chromium | 0.1 | 10 | polypropylene | 90 | titanium white | 10 | polypropylene | 60 | titanium white | 10 | 156 |
| | lid | steel | 40 | nickel (lower layer) chromium (upper layer) | 1.0 / 0.07 | 10 | polypropylene | 25 | titanium white | 6 | epoxy-phenolic resin | 5 | titanium white | 5 | 33 |
| Example 33 | drawn container | steel | 70 | chromium | 0.1 | 10 | polypropylene | 90 | titanium white | 10 | polypropylene | 80 | titanium white | 10 | 176 |
| | lid | steel | 40 | nickel (lower layer) chromium (upper layer) | 1.0 / 0.07 | 10 | polypropylene | 15 | titanium white | 6 | epoxy-phenolic resin | 5 | titanium white | 5 | 23 |

TABLE 2-continued

| | Type | Material | Col4 | Plating | Col6 | Col7 | Resin 1 | Col9 | Pigment 1 | Col11 | Resin 2 | Col13 | Pigment 2 | Col15 | Col16 |
|---|---|---|---|---|---|---|---|---|---|---|---|---|---|---|---|
| Example 34 | drawn container | steel | 70 | (upper layer) chromium | 0.1 | 10 | poly-propylene | 95 | titanium white | 10 | poly-propylene | 95 | titanium white | 10 | 196 |
| | lid | steel | 40 | nickel (lower layer) chromium (upper layer) | 1.0 0.07 | 10 | poly-propylene | 10 | titanium white | 6 | epoxy-phenolic resin | 5 | titanium white | 5 | 18 |
| Comparative Example 28 | drawn container | steel | 70 | (upper layer) chromium | 0.1 | 10 | poly-propylene | 100 | titanium white | 10 | poly-propylene | 100 | titanium white | 10 | 206 |
| | lid | steel | 40 | nickel (lower layer) chromium (upper layer) | 1.0 0.07 | 10 | poly-propylene | 10 | titanium white | 6 | epoxy-phenolic resin | 1 | titanium white | 5 | 14 |
| Example 35 | drawn container | steel | 50 | chromium | 0.15 | 20 | poly-propylene | 50 | titanium white | 10 | poly-propylene | 30 | titanium white | 5 | 86 |
| | lid | steel | 100 | nickel | 12 | 20 | poly-propylene | 30 | titanium white | 6 | epoxy-phenolic resin | 5 | titanium white | 5 | 38 |
| Example 36 | drawn container | steel | 50 | chromium | 0.15 | 20 | poly-propylene | 50 | titanium white | 10 | poly-propylene | 30 | titanium white | 5 | 86 |
| | lid | steel | 110 | nickel | 12 | 20 | poly-propylene | 30 | titanium white | 6 | epoxy-phenolic resin | 5 | titanium white | 5 | 38 |
| Example 37 | drawn container | steel | 50 | chromium | 0.15 | 20 | poly-propylene | 50 | titanium white | 10 | poly-propylene | 30 | titanium white | 5 | 86 |
| | lid | steel | 120 | nickel | 12 | 20 | poly-propylene | 30 | titanium white | 6 | epoxy-phenolic resin | 5 | titanium white | 5 | 38 |
| Comparative Example 29 | drawn container | steel | 50 | chromium | 0.15 | 20 | poly-propylene | 50 | titanium white | 10 | poly-propylene | 30 | titanium white | 5 | 86 |
| | lid | steel | 130 | nickel | 12 | 20 | poly-propylene | 30 | titanium white | 6 | epoxy-phenolic resin | 5 | titanium white | 5 | 38 |
| Comparative Example 30 | drawn container | aluminum | 120 | not plated | — | — | poly-propylene | 50 | titanium white | 10 | poly-propylene | 30 | titanium white | 5 | 86 |
| | lid | aluminum | 100 | not plated | — | — | poly-propylene | 30 | titanium white | 6 | epoxy-phenolic resin | 5 | titanium white | 5 | 38 |
| Example 38 | drawn container | steel | 50 | chromium | 0.3 | 20 | poly-propylene | 50 | titanium white | 10 | poly-propylene | 40 | titanium white | 5 | 96 |
| | lid | steel | 50 | nickel | 3 | 10 | poly-propylene | 40 | titanium white | 6 | epoxy-phenolic resin | 5 | titanium white | 5 | 48 |
| Example 39 | drawn container | steel | 50 | chromium | 0.5 | 20 | poly-propylene | 50 | titanium white | 10 | poly-propylene | 40 | titanium white | 5 | 96 |
| | lid | steel | 50 | nickel | 3 | 10 | poly-propylene | 40 | titanium white | 6 | epoxy-phenolic resin | 5 | titanium white | 5 | 48 |
| Example 40 | drawn container | steel | 50 | chromium | 0.06 | 20 | poly-propylene | 50 | titanium white | 10 | poly-propylene | 40 | titanium white | 5 | 96 |
| | lid | steel | 50 | nickel | 3 | 10 | poly-propylene | 40 | titanium white | 4 | epoxy-phenolic resin | 5 | titanium white | 5 | 48 |

TABLE 2-continued

| | | | | | | | | | | | | |
|---|---|---|---|---|---|---|---|---|---|---|---|---|
| Example 41 | drawn container | steel | 50 | chromium | 0.04 | 20 | poly-propylene | 50 | titanium white | 40 | poly-propylene | 10 | titanium white | 5 | 96 |
| | lid | steel | 50 | nickel | 3 | 10 | poly-propylene | 40 | titanium white | 5 | epoxy-phenolic resin | 6 | titanium white | 5 | 48 |
| Comparative Example 31 | drawn container | steel | 50 | chromium | 0.02 | 20 | poly-propylene | 50 | titanium white | 40 | poly-propylene | 10 | titanium white | 5 | 96 |
| | lid | steel | 50 | nickel | 3 | 10 | poly-propylene | 40 | titanium white | 5 | epoxy-phenolic resin | 6 | titanium white | 5 | 48 |
| Comparative Example 32 | drawn container | steel | 50 | chromium | 0.6 | 20 | poly-propylene | 50 | titanium white | 40 | poly-propylene | 10 | titanium white | 5 | 96 |
| | lid | steel | 50 | nickel | 3 | 10 | poly-propylene | 40 | titanium white | 5 | epoxy-phenolic resin | 6 | titanium white | 5 | 48 |
| Example 42 | drawn container | steel | 50 | tin | 0.8 | — | poly-propylene | 50 | titanium white | 40 | poly-propylene | 10 | not added | — | 96 |
| | lid | steel | 50 | tin | 0.8 | — | poly-propylene | 40 | titanium white | 5 | epoxy-phenolic resin | 6 | not added | — | 48 |

| | Evaluation | | | | | | | |
|---|---|---|---|---|---|---|---|---|
| | Drawn Container | | | Lid | | | | Amount (ml) of Generated Hydrogen |
| | inner face state | outer face state | state after draw-forming | inner face state | outer face state | rusting on cut edge | safety of cut edge | |
| Example 28 | normal | normal | normal | normal | normal | 5 | 5 | 0.001 |
| Example 29 | normal | normal | normal | normal | normal | 5 | 5 | 0.001 |
| Example 30 | normal | normal | normal | normal | normal | 5 | 5 | 0.001 |
| Example 31 | slightly dark hue | slightly dark hue | partial wrinkling in flange portion | normal | normal | 5 | 5 | 0.004 |
| Example 26 | dark hue | dark hue | wrinkling in entire flange portion | normal | normal | 5 | 5 | 0.05 |
| Example 27 | partial rusting | dark hue | wrinkling in flange portion and side wall | normal | normal | 5 | 5 | 0.5 |
| Example 32 | normal | normal | wrinkling in flange portion and side wall | normal | normal | 5 | 5 | 0.001 |
| Example 33 | normal | normal | wrinkling in flange portion and side wall | normal | normal | 5 | 4 | 0.001 |
| Example 34 | normal | normal | partial wrinkling in flange portion | normal | normal | 5 | 3 | 0.005 |
| Comparative Example 28 | peeling and rusting in wrinkled portion | partial peeling in wrinkled portion | wrinkling in flange portion and side wall | normal | normal | 5 | 1 | 0.7 |
| Example 35 | normal | normal | normal | normal | normal | 5 | 5 | 0.001 |
| Example 36 | normal | normal | normal | normal | normal | 5 | 5 | 0.001 |
| Example 37 | normal | normal | normal | normal | normal | 4 | 4 | 0.001 |
| Comparative | normal | normal | normal | normal | normal | 2 | 1 | 0.001 |

TABLE 2-continued

| | | | | | | | |
|---|---|---|---|---|---|---|---|
| Example 29 | | | | | | | |
| Comparative Example 30 | partial peeling | normal | normal | partial peeling | normal | 5 | 0.3 |
| Example 38 | normal | normal | normal | normal | normal | 5 | 0.001 |
| Example 39 | normal | normal | normal | normal | normal | 5 | 0.001 |
| Example 40 | normal | normal | normal | normal | normal | 5 | 0.001 |
| Example 41 | normal | normal | normal | normal | normal | 5 | 0.005 |
| Comparative Example 31 | partial peeling and rusting | normal | normal | normal | normal | 5 | 0.06 |
| Comparative Example 32 | partial peeling and rusting | normal | normal | normal | normal | 5 | 0.08 |
| Example 42 | normal | normal | normal | normal | normal | 5 | 0.001 |

EXAMPLE 43

Nickel was plated in an amount of 4 g/m² on both the surfaces of an electrolytic iron foil having a thickness of 20 μm and a tensile force of 32 kgf/mm² in a Watts bath (an aqueous solution containing 240 g/l of nickel sulfate, 45 g/l of nickel chloride and 30 g/l of boric acid), and the nickel-plated steel foil was cathodically electrolyzed in an electrolytic chromate treatment bath (an aqueous solution containing 60 g/l of chromic anhydride, 0.2 g/l of sulfuric acid and 0.2 g/l of sodium silicofluoride) to obtain a metallic chromium layer having a thickness corresponding to 0.1 g/m² and a chromate layer having a thickness corresponding to 10 mg/m². Incidentally, the hardness Hv of the nickle plating formed from the Watts bath was in the range of from 140 to 220.

A vinyl chloride organosol type lacquer was coated on one surface of the so-obtained surface-treated iron foil so that the thickness of the coating after baking was 7 μm, and the coating was baked at 240° C. for 30 seconds. A polyester film having a thickness of 50 μm, on which aluminum had been vacuum-deposited in a thickness of 0.08 μm, was laminated on the other surface of the iron foil by using a urethane type adhesive (3 μm in thickness) to form a tape tab material. A tape tab piece having a size of 2 cm×4 cm was formed from this tape tab material by punching.

A tape-seal lid was prepared by using this tape tab piece according to the process for the production of an easy-openable container lid, disclosed in Japanese Patent Publication No. 52096/84.

A 250-gram bonded can body formed of a tin-free steel sheet having a thickness of 0.22 mm and having an inner diameter of 52.3 mm, to one end of which an ordinary container lid was double-seamed, was hot-filled with a vegetable juice at 93° C., and the above tape-seal lid was double-seamed to the other end of the bonded an body to obtained a canned fruit juice.

The canned fruit juice was stored at room temperature for 2 years, and the inner face and outer face states of the tape tab, rusting on the cut edge and the safety of the cut edge were examined. The obtained results are shown in Table 3.

EXAMPLES 44, 45 AND 46

Packed cans were formed and tested in the same manner as described in Example 43 except that the thickness of the organic resin coating on the inner face of the tape tab was changed to 6, 8 or 3 μm and the thickness of the organic resin coating on the outer face of the tape tab was changed to 35, 12 or 12 μm. The obtained results are shown in Table 3.

COMPARATIVE EXAMPLE 33

A packed can was formed and tested in the same manner as described in Example 43 except the thickness of the organic resin coating on the inner face of the tape tab was changed to 5 μm and the thickness of the organic resin coating on the outer face of the tape tab was changed to 5 μm as well as the thickness of the inner face organic resin coating. The obtained results are shown in Table 3.

COMPARATIVE EXAMPLE 34

A packed can was formed and tested in the same manner as described in Example 43 except that the organic resin coating was not formed on the outer face of the tape tab. The obtained results are shown in Table 3.

COMPARATIVE EXAMPLE 35

A packed can was formed and tested in the same manner as described in Example 43 except that a phosphate/chromate-treated aluminum foil (the amount coated was 10 mg/m² as chromium) having a thickness of 50 μm was used as the foil material. The obtained results are shown in Table 3.

EXAMPLE 47

Nickel was plated in a thickness corresponding to 0.5 g/m² on both the surfaces of an electrolytic iron foil having a thickness of 25 μm, and the iron foil was cathodically electrolyzed in a chromate treatment bath (an aqueous solution containing 20 g/l of chromic anhydride) to form a chromate layer having a thickness corresponding to 20 mg/m².

In the same manner as described in Example 43, a vinyl chloride lacquer was coated in a thickness of 8 μm on one surface of the so-obtained surface-treated iron foil and a polyester film having a thickness of 35 μm, on which aluminum was vacuum-deposited in a thickness of 0.05 μm in advance, was laminated on the other surface of the surface-treated iron foil.

A packed can was formed and tested in the same manner as described in Example 43. The obtained results are shown in Table 3.

EXAMPLE 48 AND COMPARATIVE EXAMPLE 36

Packed cans were formed and tested in the same manner as described in example 47 except that the amount plated of nickel was changed to 0.15 or 0.09 g/m². The obtained results are shown in Table 3.

COMPARATIVE EXAMPLE 37

A packed can was formed and tested in the same manner as described in Example 47 except that chromium was plated in an amount of 0.2 g/m² on both the surfaces of an electrolytic iron foil having a thickness of 25 μm in a Sargent bath (an aqueous solution containing 250 g/l of chromic anhydride and 2.5 g/l of sulfuric acid). Incidentally, the hardness Hv of the chromium plating formed from the Sargent bath was in the range of from 510 to 1000. The obtained results are shown in Table 3.

COMPARATIVE EXAMPLE 38

A packed cup was formed and tested in the same manner as described in Example 47 except that the iron foil was not surface-treated. The obtained results are shown in Table 3.

EXAMPLES 49 AND 50 AND COMPARATIVE EXAMPLE 39

Packed cans were formed and tested in the same manner as described in Example 47 exept that the thickness of aluminum vacuum-deposited on the polyester was changed to 0.03, 0.01 or 0.005 μm. The obtained results are shown in Table 3.

TABLE 3

| | Foil | | Surface Treatment | | | Inner Face Organic Coating | | | | | Outer Face Organic Coating | | | | Total Organic Coating Thickness (μm) Inclusive of That of Adhesive Layer | Evaluation Tape Tab | | | | |
|---|---|---|---|---|---|---|---|---|---|---|---|---|---|---|---|---|---|---|---|---|
| | | | metal plating | | amount (mg/m²) of chromate | organic resin | | metal or inorganic pigment | | | organic resin | | metal or inorganic pigment | | | | | | | |
| | kind | thickness (μm) | kind | thickness (g/m²) | | kind | thickness (μm) | kind | amount (g/m²) | | kind | thickness (μm) | kind | amount (g/m²) | | inner face state | outer face state | rusting on cut edge | safety of cut edge |
|---|---|---|---|---|---|---|---|---|---|---|---|---|---|---|---|---|---|---|---|
| Example 43 | iron | 20 | nickel (lower layer) chromium (upper layer) | 4 / 0.1 | 10 | polyvinyl chloride | 7 | — | — | | polyester | 50 | vacuum-deposited aluminum | 0.08 | 60 | normal | normal | 5 | 5 |
| Example 44 | iron | 20 | nickel (lower layer) chromium (upper layer) | 4 / 0.1 | 10 | polyvinyl chloride | 6 | — | — | | polyester | 35 | vacuum-deposited aluminum | 0.08 | 44 | normal | normal | 5 | 5 |
| Example 45 | iron | 20 | nickel (lower layer) chromium (upper layer) | 4 / 0.1 | 10 | polyvinyl chloride | 8 | — | — | | polyester | 12 | vacuum-deposited aluminum | 0.08 | 23 | normal | normal | 5 | 4 |
| Example 46 | iron | 20 | nickel (lower layer) chromium (upper layer) | 4 / 0.1 | 10 | polyvinyl chloride | 3 | — | — | | polyester | 12 | vacuum-deposited aluminum | 0.08 | 18 | normal | normal | 5 | 3 |
| Comparative Example 33 | iron | 20 | nickel (lower layer) chromium (upper layer) | 4 / 0.1 | 10 | polyvinyl chloride | 5 | — | — | | polyvinyl chloride | 5 | not formed | — | 10 | normal | bad appearance | 5 | 1 |
| Comparative Example 34 | iron | 20 | nickel (lower layer) chromium (upper layer) | 4 / 0.1 | 10 | polyvinyl chloride | 7 | — | — | | — | — | — | — | 7 | normal | pitting | 1 | 1 |
| Comparative Example 35 | aluminum | 50 | — | — | — | polyvinyl chloride | 7 | — | — | | polyester | 50 | vacuum-deposited aluminum | 0.08 | 60 | piercing holes formed | peeling and leakage owing to corrosion below coating | 4 | 5 |
| Example 47 | iron | 25 | nickel | 0.5 | 20 | polyvinyl chloride | 8 | — | — | | polyester | 35 | vacuum-deposited aluminum | 0.05 | 46 | normal | normal | 5 | 5 |
| Example 48 | iron | 25 | nickel | 0.15 | 20 | polyvinyl chloride | 8 | — | — | | polyester | 35 | vacuum-deposited aluminum | 0.05 | 46 | normal | normal | 4 | 5 |
| Comparative Example 36 | iron | 25 | nickel | 0.09 | 20 | polyvinyl chloride | 8 | — | — | | polyester | 35 | vacuum-deposited aluminum | 0.05 | 46 | normal | normal | 2 | 5 |
| Comparative Example 37 | iron | 25 | chromium | 0.2 | 20 | polyvinyl chloride | 8 | — | — | | polyester | 35 | vacuum-deposited aluminum | 0.05 | 46 | normal | normal | 1 | 5 |

TABLE 3-continued

| | Foil | | Surface Treatment | | | Inner Face Organic Coating | | | | | Outer Face Organic Coating | | | | Total Organic Coating Thickness (μm) Inclusive of That of Adhesive Layer | Evaluation | | | |
| | | | metal plating | | amount of chromate (mg/m²) | organic resin | | metal or inorganic pigment | | | organic resin | | metal or inorganic pigment | | | | Tape Tab | | |
| | kind | thickness (μm) | kind | thickness (g/m²) | | kind | thickness (μm) | kind | amount (g/m²) | | kind | thickness (μm) | kind | amount (g/m²) | | inner face state | outer face state | rusting on cut edge | safety of cut edge |
|---|---|---|---|---|---|---|---|---|---|---|---|---|---|---|---|---|---|---|---|
| Comparative Example 38 | iron | 25 | untreated | — | — | polyvinyl chloride | 8 | — | — | | polyester | 35 | vacuum-deposited aluminum | 0.05 | 46 | piercing holes formed | peeling and leakage owing to corrosion below coating | 1 | 5 |
| Example 49 | iron | 25 | nickel | 0.5 | 20 | polyvinyl chloride | 8 | — | — | | polyester | 35 | vacuum-deposited aluminum | 0.03 | 46 | normal | normal | 5 | 5 |
| Example 50 | iron | 25 | nickel | 0.5 | 20 | polyvinyl chloride | 8 | — | — | | polyester | 35 | vacuum-deposited aluminum | 0.01 | 46 | normal | slightly influence of underground hue | 5 | 5 |
| Comparative Example 39 | iron | 25 | nickel | 0.5 | 20 | polyvinyl chloride | 8 | — | — | | polyester | 35 | vacuum-deposited aluminum | 0.005 | 46 | normal | bad appearance | 5 | 5 |

EXAMPLE 51

Tin was plated in an amount of 0.6 g/m² on both the surfaces of an electrolytic iron foil having a thickness of 50 μm in a tin borofluoride plating bath (an aqueous solution containing 50 g/l of stannous borofluoride, 20 g/l of stannous tin, 100 g/l of free borofluoric acid, 25 g/l of free boric acid and 10 ml/l of formalin). The hardness Hv of the obtained tin-plating layer was 40. Then, the iron foil was cathodically electrolyzed in an electrolytic chromate treatment bath to form a metallic chromium layer having a thickness corresponding to 0.03 g/m² and a chromate layer having a thickness corresponding to 7 mg/m². By using a urethane type adhesive, a polypropylene film containing 6 g/m² of titanium white and having a thickness of 40 μm was laminated on one surface of the surface-treated iron foil and a polyester film having a thickness of 25 μm, on which aluminum had been vacuum-deposited in a thickness of 0.05 μm, was laminated on the other surface of the iron foil.

A rectangular piece having a size of 10 cm×16 cm was punched out from the so-obtained organic resin-coated iron foil, and two of such cut pieces were piled so that the polypropylene film sides of the cut pieces confronted each other. Three sides, except one of the short sides having a length of 10 cm, were heat-sealed along a width of 5 mm to form a retortable pouch. Tomato stew was filled in the retortable pouch, and the pouch was heat-sealed and heat-sterilized at 120° C. for 30 minutes.

The pouch was stored at room temperature for 2 years, and the inner face and outer face states, rusting on the cut edge and the safety of the cut edge were examined. The obtained results are shown in Table 4.

COMPARATIVE EXAMPLE 40

A retortable pouch was formed and tested in the same manner as described in Example 51 except that as the surface treatment of the electrolytic iron foil, a rhodium plating layer having a hardness Hv of 850 and an amount deposited of 1.0 g/m² was formed in a plating bath consisting of an aqueous solution containing 7 g/l of rhodium sulfate and 20 ml/l of sulfuric acid. The obtained results are shown in Table 4.

COMPARATIVE EXAMPLE 41

A retortable pouch was formed and tested in the same manner as described in Example 51 except that as the surface treatment of the electrolytic iron foil, a cobalt plating layer having a hardness Hv of 520 and an amount deposited of 1.0 g/m² was formed in a plating bath consisting of an aqueous solution containing 500 g/l of cobalt sulfate, 15 g/l of sodium chloride and 40 g/l of boric acid. The obtained results are shown in Table 4.

COMPARATIVE EXAMPLE 42

A retortable pouch was formed and tested in the same manner as described in Example 51 except that as the surface treatment of the electrolytic iron foil, a palladium plating layer having a hardness Hv of 580 and an amount deposited of 1.0 g/m² was formed in a plating bath consisting of an aqueous solution containing 6 g/l of palladium chloride and 9 g/l of ammonium chloride. The obtained results are shown in Table 4.

COMPARATIVE EXAMPLE 43

A retortable pouch was formed and tested in the same manner as described in Example 51 except that as the surface treatment of the electrolytic iron foil, a platinum plating layer having a hardness Hv of 820 and an amount deposited of 1.0 g/m² was formed in a plating bath consisting of an aqueous solution containing 1.5 g/l of chloroplatinic acid, 20 g/l of ammonium phosphate and 95 g/l of sodium phosphate. The obtained results are shown in Table 4.

TABLE 4

| | Foil | | Surface Treatment | | | Inner Face Organic Coating | | | | Outer Face Organic Coating | |
|---|---|---|---|---|---|---|---|---|---|---|---|
| | | | metal plating | | amount (mg/m²) of chromate | organic resin | | metal or inorganic pigment | | organic resin | |
| | kind | thickness (μm) | kind | thickness (g/m²) | | kind | thickness (μm) | kind | amount (g/m²) | kind | thickness (μm) |
| Example 51 | iron | 15 | tin (lower layer) chromium (upper layer) | 0.6 0.03 | 7 | polypropylene | 40 | titanium white | 6 | polyester | 25 |
| Comparative Example 40 | iron | 15 | rhodium | 1.0 | 7 | polypropylene | 40 | titanium white | 6 | polyester | 25 |
| Comparative Example 41 | iron | 15 | cobalt | 1.0 | 7 | polypropylene | 40 | titanium white | 6 | polyester | 25 |
| Comparative Example 42 | iron | 15 | palladium | 1.0 | 7 | polypropylene | 40 | titanium white | 6 | polyester | 25 |
| Comparative Example 43 | iron | 15 | platinum | 1.0 | 7 | polypropylene | 40 | titanium white | 6 | polyester | 25 |

| | Outer Face Organic Coating | | Total Organic Coating Thickness (μm) Inclusive of That of Adhesive Layer | Evaluation retortable pouch | | | |
|---|---|---|---|---|---|---|---|
| | metal or inorganic pigment | | | inner face state | outer face state | rusting on cut edge | safety of cut edge |
| | kind | amount (g/m²) | | | | | |
| Example 51 | vacuum-deposited aluminum | 0.05 | 71 | normal | normal | 5 | 5 |
| Comparative Example 40 | vacuum-deposited aluminum | 0.05 | 71 | normal | normal | 1 | 5 |
| Comparative Example 41 | vacuum-deposited aluminum | 0.05 | 71 | normal | normal | 2 | 5 |
| Comparative Example 42 | vacuum-deposited aluminum | 0.05 | 71 | rusting | normal | 1 | 5 |
| Comparative Example 43 | vacuum-deposited aluminum | 0.05 | 71 | normal | normal | 1 | 5 |

From the results obtained in Examples 1 through 27 and Comparative Examples 1 through 25, it is seen that in order to obtain an excellent draw-formed container, it is important that the relation of $T^{1/n} \cdot C/\sigma_B \geq t \geq 3$ μm in which n is 5.6 and C is 4630 should be established among the tensile force $\sigma_B$ and thickness T of the iron foil and the total organic resin coating thickness t. It also is seen that electrolytically chromate-treated steel foil, nickel-plated steel foil and tin-plated foil give a much higher corrosion resistance than untreated steel foil, chromate-treated steel foil and phosphate/chromate-treated steel foil.

From the results obtained in Examples 28 and 32 through 34 and Comparative Example 28, it is seen that in order to obtain a draw-formed container excellent in corrosion resistance and the formed shape, it is important that the total organic resin coating thickness should be within the range of from 15 to 200 μm. It also is seen that from the viewpoint of the degree of safety of the cut edge of the heat-sealable lid, it is important that the total organic resin coating thickness should be in the range of from 15 to 200 μm.

From the results obtained in Examples 35 through 37 and Comparative Examples 29 and 30, it is seen that in order to obtain a heat-sealable lid excellent in the corrosion resistance, the effect of preventing the cut edge from rusting and the degree of safety of the cut edge, it is important that the thickness of the steel foil should be in the range of from 5 to 120 μm.

From the results obtained in Examples 38 through 41 and Comparative Examples 31 and 32, it is seen that in order to obtain a draw-formed container excellent in corrosion resistance, it is important that the thickness of the metallic chromium layer should be in the range of from 0.03 to 0.5 g/m².

From the results obtained in Example 42, it is seen that a draw-formed container or lid prepared from a rolled steel foil which has been plated with tin in advance is excellent in corrosion resistance, the effect of preventing the cut edge from rusting and the degree of safety of the cut edge.

Tape tabs of tape-seal cans were evaluated in Examples 43 through 50 and Comparative Examples 33 through 39. From the results obtained in Examples 43 through 46 and Comparative Examples 33 and 34, it is seen that the degree of safety of the cut edge is drastically reduced if the total organic resin coating thickness is smaller than 15 μm. It also is seen that when an outer face organic resin coating free of a metal is used or an outer face organic coating is not formed as in Comparative Example 33 or 34, the appearance characteristics are degraded or a problem of rusting arises. Furthermore, it is seen that if an aluminum foil is used instead of the iron or steel foil as in Comparative Example 35, no satisfactory corrosion resistance can be obtained. From the results obtained in Examples 47 and 48 and Comparative Examples 36, 37 and 38, it is seen that in order to attain rust-preventive effect on the cut edge, it is important that an anti-corrosive metal having a Vickers hardness Hv smaller than 500 should be deposited in an amount of 0.1 to 15 g/m². From the results obtained in Examples 43, 49 and 50 and Comparative Examples 33, 34 and 39, it is seen that in order to maintain a good appearance for a long time, it is important that the thickness of the metal layer in the outer face coating should be 0.01 to 0.2 μm.

Containers comprising a draw-formed cup and a heat-sealable lid were evaluated in Examples 28 through 42 and Comparative Examples 26 through 32. From the results obtained in Examples 28 through 31 and Comparative Examples 26 and 27, it is seen that in order to obtain a draw-formed container excellent in corrosion resistance, the container shape and the appearance, it is important that the amount of the pigment in the organic resin coating should be in the range of from 0.5 to 30 g/m².

Retortable pouches were evaluated in Example 51 and Comparative Examples 40 through 43. From the results obtained in Example 51 and Comparative Examples 40 through 43, it is seen that in order to obtain a retortable pouch excellent in corrosion resistance and the rust-preventive effect on the cut edge, it is important that as the surface treatment of the iron foil, a metal having an anticorrosive effect and a Vickers hardness Hv smaller than 500 should be plated in a thickness corresponding to 0.1 to 15 g/m².

We claim:

1. A packaging material, which comprises a laminate having an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ μm} \geq T \geq 15 \text{ μm,}$$

and being provided with a surface treatment layer containing metallic tin, metallic chromium or metallic nickel, and an organic resin covering having a total thickness (t) in the range represented by the following formula:

$$T^{1/n} C/\sigma_B \geq t \geq 3 \text{ μm}$$

wherein n is 5.6 and C is 4630.

2. A packaging material as set forth in claim 1, wherein the iron foil is an electrolytically chromate-treated steel foil comprising a steel substrate, a metallic chromium layer deposited in an amount of 0.03 to 0.5 g/m² on the steel substrate and a chromium oxide layer deposited in an amount of 3 to 50 mg/m² as the Cr atom on the metallic chromium layer.

3. A draw-formed container obtained by draw-forming a laminate as set forth in claim 1.

4. A draw-formed container as set forth in claim 3, wherein the total drawing ratio is in the range of from 1.5 to 3.5.

5. A draw-formed container as set forth in claim 3, wherein the organic resin coating is a film of a thermoplastic resin selected from a polyolefin, a polyester, a polyamide and a vinyl chloride/vinyl acetate copolymer.

6. A draw-formed container as set forth in claim 5, wherein the resin film is present as an inner face-coating material in the container.

7. A packaging material as set forth in claim 1, wherein at least one surface of the iron foil has an organic resin coating layer containing a metal or pigment, which is present in a sufficient amount to intercept a corrosive component and prevent corrosion of said iron foil as well as substantially hiding any corrosion on said iron foil, and the entire organic resin coating on the iron foil substrate has a thickness of 15 to 200 μm.

8. A packaging material as set forth in claim 7, wherein the metal-containing organic resin coating layer is a thermoplastic resin film having metallic aluminum vacuum-deposited thereon.

9. A packaging material as set forth in claim 8, wherein the thermoplastic resin film is a polyester film or polypropylene film.

10. A packaging material as set forth in claim 7, wherein the pigment-containing organic resin coating layer is a resin film, adhesive layer or coating in which titanium dioxide is incorporated.

11. A packaging material as set forth in claim 11, wherein titanium dioxide is incorporated so that the amount coated of titanium dioxide is 0.5 to 30 g/m².

12. A packaging material as set forth in claim 7, wherein in the surface treatment layer, a metal having a Vickers hardness Hv smaller than 500 is plated in an amount deposited of 0.1 to 15 g/m².

13. A draw-formed container composed of a packaging material as set forth in claim 7.

14. A lid composed of a packaging material as set forth in claim 7.

15. A retortable pouch composed of a packaging material as set forth in claim 7.

16. A tape tab composed of a packaging material as set forth in claim 7.

17. A cylindrical container having a side seam formed by bonding or welding both the ends of a packaging material as set forth in claim 7.

18. In a draw-formed container obtained by draw-forming a laminate comprising an iron substrate and an organic resin covering, an improvement wherein the laminate comprises (A) an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ μm} \geq T \geq 15 \text{ μm}$$

said iron foil being an electrolytically chromate-treated steel foil comprising a steel substrate, a metallic chromium layer deposited in an amount of 0.03 to 0.5 g/m² on the steel substrate and a chromium oxide layer deposited in an amount of 3 to 50 mg/m² as the Cr atom on the metallic chromium layer, and (B) an organic resin covering having a total thickness (t) in the range represented by the following formula:

$$T^{1/n}C/\sigma_B \geq t \geq 3 \text{ μm}$$

wherein n is 5.6 and C is 4630, said organic resin covering is a resin film containing a titanium dioxide pigment, the coated amount of the titanium oxide pigment being 0.5 to 30 g/m², and the total drawing ratio is in the range of from 1.5 to 3.5.

19. In a heat-sealable lid comprising a laminate of an iron substrate and a heat-sealable resin layer, an improvement wherein said laminate comprises (A) an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ μm} \geq T \geq 15 \text{ μm}$$

said iron foil having a metal-plated layer composed of a metal selected from the group consisting of metallic tin and metallic nickel, said metal having a Vickers hardness (Hv) smaller than 500 and said metal being plated in an amount deposited of 0.1 to 15 g/m², (B) a heat-sealable inner face-protecting lacquer composed of polyethylene or polypropylene having titanium oxide incorporated therein, and (C) an outer face-protecting coating layer composed of a thermosetting lacquer having titanium oxide incorporated therein and a biaxially drawn, heat-set polyethylene terephthalate film provided with a metallic aluminum-vacuum-deposited layer, the coated amount of titanium oxide in each of the inner and outer protecting layers being 0.5 to 30 g/m².

20. In a tape tab for a tape-seal lid comprising a laminate of a metal foil substrate and an organic resin covering, an improvement wherein the laminate comprises (A) an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ μm} \geq T \geq 15 \text{ μm}$$

said iron foil having a metal-plated layer composed of a metal selected from the group consisting of metallic tin and metallic nickel, said metal having a Vickers hardness (Hv) smaller than 500 and said metal being plated in an amount deposited of 0.1 to 15 g/m², (B) an inner face-protecting resin layer, and (C) an outer face-protecting resin coating comprising a thermosetting lacquer having titanium dioxide incorporated therein and a biaxially drawn, heat-set polyethylene terephthalate film provided with a metallic aluminum-vacuum-deposited layer.

21. In a retortable pouch comprising a laminate of a metal foil substrate, a heat-sealable inner resin layer and a protective outer coating layer, the laminate being folded so that the inner layers confront each other and sides of the laminate being heat-sealed, an improvement wherein said laminate comprises (A) an iron foil having a tensile strength ($\sigma_B$) in the range represented by the following formula:

$$100 \text{ kg/mm}^2 \geq \sigma_B \geq 30 \text{ kg/mm}^2$$

and a thickness (T) in the range represented by the following formula:

$$120 \text{ μm} \geq T \geq 15 \text{ μm}$$

said iron foil having a metal-plated layer composed of a metal selected from the group consisting of metallic tin and metallic nickel, said metal having Vickers hardness (Hv) smaller than 500 and said metal being plated in an amount deposited of 0.1 to 15 g/m², (B) a heat-sealable inner face-protecting layer composed of polyethylene or polypropylene, and (C) an outer face-protecting resin coating comprising a thermosetting lacquer having titanium dioxide incorporated therein and a biaxially drawn, heat-set polyethylene terephthalate film provided with a metallic aluminum-vacuum-deposited layer.

* * * * *